US009781211B2

(12) United States Patent
Langas et al.

(10) Patent No.: US 9,781,211 B2
(45) Date of Patent: *Oct. 3, 2017

(54) STORAGE DEVICE HAVING MASTER AND SLAVE STORAGE DEVICE MODES

(71) Applicant: Millennium Enterprise Corporation, Fairfax, VA (US)

(72) Inventors: Thomas Langas, Trondheim (NO); Asbjorn Djupdal, Trondheim (NO); Borgar Ljosland, Trondheim (NO); Torstein Hernes Dybdahl, Trondheim (NO)

(73) Assignee: Millennium Enterprise Corporation, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,056

(22) Filed: Oct. 24, 2016

(65) Prior Publication Data

US 2017/0054805 A1    Feb. 23, 2017

Related U.S. Application Data

(63) Continuation of application No. 14/724,680, filed on May 28, 2015, now Pat. No. 9,479,590, which is a
(Continued)

(30) Foreign Application Priority Data

Aug. 27, 2010   (GB) .................................. 1014373.3
Apr. 28, 2011   (GB) .................................. 1107266.7

(51) Int. Cl.
*G06F 21/00*     (2013.01)
*G06F 12/00*     (2006.01)
(Continued)

(52) U.S. Cl.
CPC .......... *H04L 67/1097* (2013.01); *G06F 3/061* (2013.01); *G06F 3/0605* (2013.01);
(Continued)

(58) Field of Classification Search
USPC ......................................... 709/203, 209, 245
See application file for complete search history.

(56) References Cited

U.S. PATENT DOCUMENTS

| 5,004,232 A | 4/1991 | Wong et al. |
| 5,579,489 A | 11/1996 | Dornier et al. |

(Continued)

FOREIGN PATENT DOCUMENTS

| JP | 20055124317 A | 5/2005 |
| WO | 2012028875 A1 | 3/2012 |
| WO | 2013008058 A1 | 1/2013 |

OTHER PUBLICATIONS

"Subject Matter Search Report", Freedom to Operate Search related to PCT/GB2011/001277 and PCT/GB2011/001278, dated Jun. 27, 2011.

(Continued)

*Primary Examiner* — Jude Jean Gilles
(74) *Attorney, Agent, or Firm* — Lawrence Youst PLLC

(57) ABSTRACT

A storage device is operable to be coupled to a host electronic device. The storage device includes a memory operable to store an operating system, applications and to provide mass storage functionality, a processor operable to run the operating system and execute the applications on the storage device and an interface is operable to couple the storage device to the host electronic device. The interface provides a data communication path and a power communication path between the storage device and the host electronic device. The storage device has a master storage device mode in which the storage device is operable to control at least one slave function of the host electronic device and a slave storage device mode in which at least one slave function of the storage device is controlled by the host electronic device.

22 Claims, 11 Drawing Sheets

Related U.S. Application Data continuation of application No. 13/819,269, filed as application No. PCT/GB2011/001278 on Aug. 26, 2011, now Pat. No. 9,134,923.

(51) Int. Cl.

| | | |
|---|---|---|
| *H04L 29/08* | (2006.01) | |
| *G06F 13/28* | (2006.01) | |
| *H04L 29/06* | (2006.01) | |
| *G06F 13/38* | (2006.01) | |
| *G06F 3/06* | (2006.01) | |
| *G06F 9/445* | (2006.01) | |
| *G06F 9/54* | (2006.01) | |
| *G06F 21/57* | (2013.01) | |
| *G06F 21/62* | (2013.01) | |
| *G06F 13/364* | (2006.01) | |
| *G06F 13/42* | (2006.01) | |
| *G06F 13/10* | (2006.01) | |

(52) U.S. Cl.
CPC .......... *G06F 3/0643* (2013.01); *G06F 3/0655* (2013.01); *G06F 3/0664* (2013.01); *G06F 3/0667* (2013.01); *G06F 3/0671* (2013.01); *G06F 3/0679* (2013.01); *G06F 3/0688* (2013.01); *G06F 9/44573* (2013.01); *G06F 9/44584* (2013.01); *G06F 9/547* (2013.01); *G06F 13/102* (2013.01); *G06F 13/28* (2013.01); *G06F 13/364* (2013.01); *G06F 13/385* (2013.01); *G06F 13/4282* (2013.01); *G06F 21/575* (2013.01); *G06F 21/6218* (2013.01); *H04L 29/08549* (2013.01); *H04L 67/42* (2013.01); *G06F 13/10* (2013.01); *Y02B 60/1228* (2013.01); *Y02B 60/1235* (2013.01)

(56) References Cited

U.S. PATENT DOCUMENTS

| | | | |
|---|---|---|---|
| 5,599,232 A | 2/1997 | Darling | |
| 5,603,056 A | 2/1997 | Totani | |
| 5,724,497 A | 3/1998 | San et al. | |
| 5,850,230 A | 12/1998 | San et al. | |
| 5,974,461 A | 10/1999 | Goldman et al. | |
| 6,003,065 A | 12/1999 | Yan et al. | |
| 6,006,319 A | 12/1999 | Takahashi et al. | |
| 6,190,257 B1 | 2/2001 | Takeda et al. | |
| 6,247,102 B1* | 6/2001 | Chin .................. | G06F 13/1642 711/126 |
| 6,516,202 B1 | 2/2003 | Hawkins et al. | |
| 6,646,653 B2 | 11/2003 | San et al. | |
| 6,715,068 B1 | 3/2004 | Abe | |
| 6,718,415 B1 | 4/2004 | Chu | |
| 6,779,066 B2 | 8/2004 | Sakamoto | |
| 6,944,859 B2 | 9/2005 | Bunger | |
| 6,978,453 B2 | 12/2005 | Rao et al. | |
| 7,028,025 B2 | 4/2006 | Collins | |
| 7,065,651 B2 | 6/2006 | Evans | |
| 7,159,059 B2 | 1/2007 | McNeil | |
| 7,337,329 B2 | 2/2008 | Evans | |
| 7,350,235 B2 | 3/2008 | Jordan | |
| 7,418,344 B2 | 8/2008 | Holtzman et al. | |
| 7,461,177 B2 | 12/2008 | Drabczuk | |
| 7,512,743 B2 | 3/2009 | Tom et al. | |
| 7,558,907 B2 | 7/2009 | Stern et al. | |
| 7,835,857 B2 | 11/2010 | Gretton | |
| 7,966,355 B2 | 6/2011 | Sherman et al. | |
| 8,166,244 B2 | 4/2012 | Fruchter et al. | |
| 8,238,972 B2 | 8/2012 | Wang et al. | |
| 8,332,583 B2 | 12/2012 | Blazevic et al. | |
| 8,699,218 B2 | 4/2014 | Xu | |
| 8,793,518 B2 | 7/2014 | Reddy | |
| 8,966,108 B2 | 2/2015 | Richter et al. | |
| 9,069,488 B2 | 6/2015 | Langas et al. | |
| 9,134,923 B2* | 9/2015 | Langas ................. | G06F 3/0605 |
| 9,479,590 B2* | 10/2016 | Langas ................. | G06F 3/0605 |
| 9,514,080 B1* | 12/2016 | Chang .................. | G06F 13/387 |
| 2002/0120706 A1* | 8/2002 | Murphy .................. | H04L 29/06 709/208 |
| 2002/0138567 A1 | 9/2002 | Ogawa | |
| 2003/0028699 A1 | 2/2003 | Holtzman et al. | |
| 2003/0135742 A1 | 7/2003 | Evans | |
| 2004/0098596 A1 | 5/2004 | Elteto et al. | |
| 2004/0123002 A1* | 6/2004 | Bennett ................. | G06F 13/102 710/74 |
| 2004/0186949 A1 | 9/2004 | Liu et al. | |
| 2004/0215706 A1 | 10/2004 | Lavender et al. | |
| 2005/0091421 A1 | 4/2005 | Odamura | |
| 2005/0102312 A1 | 5/2005 | Ohya et al. | |
| 2005/0125619 A1 | 6/2005 | Evans | |
| 2006/0101176 A1 | 5/2006 | Eric et al. | |
| 2006/0101182 A1 | 5/2006 | Drabczuk | |
| 2006/0117171 A1 | 6/2006 | Chen | |
| 2006/0123175 A1 | 6/2006 | Yu et al. | |
| 2006/0192987 A1 | 8/2006 | Wu et al. | |
| 2006/0271733 A1* | 11/2006 | Noble .................. | G06F 3/0607 711/114 |
| 2007/0022148 A1 | 1/2007 | Akers et al. | |
| 2007/0039897 A1 | 2/2007 | Drexler | |
| 2007/0088904 A1 | 4/2007 | Sinclair | |
| 2007/0168648 A1 | 7/2007 | Mardiks et al. | |
| 2007/0288553 A1 | 12/2007 | Donaghey et al. | |
| 2007/0288692 A1* | 12/2007 | Bruce .................. | G06F 3/061 711/113 |
| 2008/0005733 A1 | 1/2008 | Ramachandran et al. | |
| 2008/0010290 A1 | 1/2008 | LeCrone et al. | |
| 2008/0016176 A1 | 1/2008 | Leitner | |
| 2008/0091878 A1 | 4/2008 | Stern et al. | |
| 2008/0169907 A1* | 7/2008 | Ootsuka ................. | G08C 17/02 340/10.1 |
| 2008/0172665 A1 | 7/2008 | McIlroy | |
| 2008/0195797 A1 | 8/2008 | Sherman et al. | |
| 2008/0201714 A1 | 8/2008 | Nagashima | |
| 2008/0243466 A1 | 10/2008 | Brunet et al. | |
| 2008/0288700 A1 | 11/2008 | Holtzman et al. | |
| 2008/0295167 A1 | 11/2008 | Holtzman et al. | |
| 2008/0307142 A1 | 12/2008 | Sherman et al. | |
| 2009/0077275 A1* | 3/2009 | Zhang ................. | G06F 11/2007 710/38 |
| 2009/0150703 A1* | 6/2009 | Rave ..................... | G06F 1/3215 713/340 |
| 2009/0198877 A1* | 8/2009 | Pua ........................ | G06F 13/385 711/103 |
| 2009/0235013 A1 | 9/2009 | Seo | |
| 2009/0276524 A1 | 11/2009 | Ohtani | |
| 2010/0115177 A1 | 5/2010 | Bryant-Rich et al. | |
| 2010/0146279 A1 | 6/2010 | Lu et al. | |
| 2010/0194667 A1 | 8/2010 | Lee et al. | |
| 2010/0197289 A1 | 8/2010 | Lee et al. | |
| 2010/0197347 A1 | 8/2010 | Lee | |
| 2010/0198994 A1 | 8/2010 | Lee | |
| 2010/0199008 A1 | 8/2010 | Lee et al. | |
| 2010/0229004 A1 | 9/2010 | Asnaashari | |
| 2010/0250834 A1 | 9/2010 | Trika et al. | |
| 2011/0111802 A1 | 5/2011 | Richter et al. | |
| 2011/0249391 A1 | 10/2011 | Xu | |
| 2011/0252209 A1 | 10/2011 | Lee | |
| 2012/0023146 A1 | 1/2012 | Shoji et al. | |

OTHER PUBLICATIONS

Ahn, et al.; "Design Implementation and Performance Evaluation of Flash Memory-based File System on Chip"; Journal of Information Science and Engineering 23, pp. 1865-1887 (2007).

Backing Storage for the File-backed Storage Gadget; Jun. 14, 2005.

Benavides, et at; "The Implementation of a Hybrid-Execute-In-Place Architecture to Reduce the Embedded System Memory Footprint and Minimize Boot Time" Flash Memory Group, Intel Corporation; California State University, Sacramento; IEEE 2007, pp. 473-479.

(56) References Cited

OTHER PUBLICATIONS

Droid X by Motorola User Guide; 2011; Motorola Mobility, Inc.; pp. 1-63.
International Preliminary Report on Patentability for PCT/GB2011/001277; Mar. 5, 2013.
International Preliminary Report on Patentability for PCT/GB2011/001278; Mar. 5, 2013.
International Preliminary Report on Patentability for PCT/GB2012/052840; May 20, 2014.
Raspberry Pi Foundation, May 8, 2011, pp. 1-2.
The How-To Geek; Gmote Turns Your Android Phone Into a Remote Control for Your PC; Jul. 20, 2010; Lifehacker; pp. 1-2.
Uebayashi, "Execute-In-Place (XIP) Support for NetBSD", Tombi Inc. uebayasi@tombi.co.jp; Apr. 5, 2010, pp. 1-15.
United Kingdom Intellectual Property Office, Combined Search and Examination Report under Sections 17 and 18(3) for Application No. GB1114893.9 dated Dec. 22, 2011.
United Kingdom Intellectual Property Office, Combined Search and Examination Report under Sections 17 and 18(3) for Application No. GB1114895.4 dated Oct. 4, 2011.
United Kingdom Intellectual Property Office, Examination Report Under Section 18(3), for Application No. GB1114895.4 dated Nov. 29, 2012.
United Kingdom Intellectual Property Office, Search Report Under Section 17(5), for Application No.GB 1107266.7 dated Sep. 5, 2011.
United Kingdom Intellectual Property Office, Search Report Under Section 17(5), for Application No. GBI014373.3 dated Jun. 28, 2011.

\* cited by examiner

*block address space*

*M-S file stream packet*

*S-M file stream packet*

STORAGE DEVICE HAVING MASTER AND
SLAVE STORAGE DEVICE MODES

CROSS-REFERENCE TO RELATED
APPLICATIONS

This is a continuation of application Ser. No. 14/724,680 filed May 28, 2015, now U.S. Pat. No. 9,479,590 issued Oct. 25, 2016, which is a continuation of application Ser. No. 13/819,269 filed Jun. 12, 2013, now U.S. Pat. No. 9,134,923 issued Sep. 20, 2016, which is a National Stage Entry of international application number PCT/GB2011/001278 filed Aug. 26, 2011, which claims priority to GB application number 1107266.7 filed Apr. 28, 2011 and GB application number 1014373.3 filed Aug. 27, 2010.

TECHNICAL FIELD OF THE DISCLOSURE

The present invention relates to electronic devices and in particular to electronic devices that can interface with and use storage devices.

BACKGROUND

Many electronic devices, such as mobile phones, cameras, etc., use storage devices, such as removable memory cards, to provide additional storage capacity for example for storing content such as photographs, music or video, generated by or to be used by the device. In such arrangements, the storage device acts as a "slave" to the "master" electronic device that is accessing and using the storage on the storage device.

While the use of storage devices, such as memory cards for providing supplemental storage for electronic devices is well established, the Applicants believe that there is further scope for exploiting the ability to use storage devices with electronic devices.

SUMMARY

According to a first aspect of the present invention, there is provided a system comprising: a host electronic device; and a storage device that is coupled to the host electronic device via an interface between the host electronic device and the storage device; wherein: the storage device comprises a computing environment operable to execute one or more applications on the storage device; and the storage device comprises a server module and the electronic device comprises a client module operable to interact with each other so as to allow an application running on the storage device to use input and output functions of the host electronic device.

According to a second aspect of the present invention, there is provided a method of operating a system comprising an electronic device and a storage device that is coupled to the electronic device, the method comprising: executing an application in a computing environment on the storage device; and using a server module on the storage device and a client module on the electronic device to allow the application to use input and output functions of the electronic device.

In the present invention, a storage device for use with an electronic device is provided with a computing environment which allows applications to be executed on the storage device itself. This has the advantage that the applications being executed need not, for example, rely on the processing capabilities of a host device to which the storage device is coupled, but can instead make use of whatever computing environment is provided on the storage device itself (which may, for example, be specified as desired).

The arrangement has the further advantage that because the applications are executed in the computing environment on the storage device, they need not be tied to a particular host device but could potentially be useable with any host device that can interface appropriately with the storage device.

The invention can also accordingly be used to, in effect, "upgrade" or supplement the computing environment of a host device, by providing a further computing environment on the storage device itself. Thus the invention may be used, for example, to provide a portable (and transferable) upgrade to a host device, for example to upgrade a relatively low end electronic device.

The Applicants have further recognised that the utility of the present invention will be enhanced if an application that is being executed on the storage device can nonetheless access and use at least input and output functions on the host electronic device to which the storage device is coupled. This will then allow, for example, a user of the host device to interact with the application that is running in the computing environment of the storage device.

In order to facilitate this, in the present invention the storage device and the host electronic device are provided with a server module and a corresponding client module, respectively. The server module on the storage device allows the storage device to act as a master, controlling input and output functions of the host device via the client module on the host device. The client module on the host device is operable to interface with the master storage device and to use the input and output functions on the host device on behalf of the "master" storage device. In this way, the respective server and client modules allow an application that is running on the storage device to use input and output functions of the host electronic device.

It should be noted here that the arrangement of the present invention is such that an application is executed in a computing environment on the storage device, and the storage device then acts as a "master", controlling slave functions on the host electronic device (which is therefore a "slave" to the "master" storage device). This should be contrasted with, for example, the situation where a storage device may store application code for a given application, but the application is then executed on the host electronic device.

The present invention also extends to the storage device on its own, and to the host electronic device on its own. (Since, for example, any electronic device equipped with the appropriate client module will be able to interact with a suitably equipped storage device, and vice versa.)

Thus, according to a third aspect of the present invention, there is provided a storage device, comprising: a memory for storing content for or generated by a host device to which the storage device is coupled; a device host interface for allowing a host device that the storage device is coupled to read data from and write data to the storage device; a computing environment operable to execute one or more applications on the storage device; and a server module operable to interact with a client module on a host device to allow an application running on the storage device to use input and output functions of the host device via the device host interface.

According to a fourth aspect of the present invention, there is provided an electronic device comprising: an interface for allowing the electronic device to be coupled to a storage device; and a client module operable to interact with a server module on a storage device to which the electronic device is coupled to allow an application running in a computing environment provided on the storage device to use input and output functions of the electronic device via the interface between the electronic device and the storage device.

The host electronic device may be any suitable such device that can be coupled to and interface with the storage device. It could, for example, be an appliance such as a television, printer, washing machine, cooker, etc., or a personal computer. In a preferred embodiment it is a portable device. Preferably it is one of a phone, a camera, a portable entertainment device (e.g. music and/or video player and/or a gaming device), a personal navigation system, and an in car navigation and/or entertainment system.

The storage device can be any suitable such device, namely a device that can provide storage for a coupled host electronic device and which supports a protocol between the storage device and the host electronic device for the purpose of storing data on (and reading data from) the storage device in which there is a master/slave interface between the host device (the master) and the storage device (the slave). It may, for example, and preferably does, comprise any suitable portable storage device, such as a portable hard drive, but it could also be a non portable storage device that has a master/slave interface, such as a non portable hard drive with a computer on board that communicate via a SATA (Serial Advanced Technology Attachment) interface.

In a preferred embodiment the storage device is a non volatile (flash) memory device, such as, and preferably, a removable memory card. In a particularly preferred embodiment, the storage device is one of an SD card (including a micro SD card), a compact flash card, and a USB memory stick.

The interface between the host device and the storage device can be any suitable such interface. As is known in the art, it will typically be a suitable wired interface (where, e.g., the storage device is used by plugging it into a suitable port on the host device). However, the interface could also be wireless, where, for example, the storage device and host device are coupled via a short range RF, IR, WLAN or other wireless link.

The client module on the host electronic device and the server module on the storage device can be provided and configured in any appropriate fashion. They are preferably provided by means of appropriate client and server, respectively, software that is running on the respective devices.

The application that is to be executed on the storage device can be any suitable and desired application. Preferably, there are a plurality of applications that can be executed on the storage device. Exemplary applications include games, productivity applications such as spreadsheets and word processors, internet browsers, email clients, video, photo and audio editing tools, internet applications, user interface applications, etc.

The code (and content) for the applications that are to be executed on the storage device should be stored in memory on the storage device that is accessible to the computing environment on the storage device. The application(s) may, for example, be stored in the "normal" memory (mass storage) that the storage device provides to the host device, or there may, e.g., be a separate memory that is provided for this purpose.

The computing environment on the storage device can comprise any suitable and desired such environment. It should comprise at least a microprocessor that is capable of running the server and executing the application or applications in question. In a preferred embodiment, the storage device has a general purpose CPU for this purpose, but it may also or instead have a more dedicated processor, such as a graphics processor. It may comprise more than one processor.

The processor(s) on the storage device should also have access to memory on the storage device (to allow it or them to run the server and application or applications). This may be the same memory as would be used by a host electronic device when it uses the storage device for storage in the normal fashion, or there may also or instead be (further) memory that is provided specifically for the use of computing environment processor(s) on the storage device. In a preferred embodiment, as well as the, e.g., normal non volatile memory on the storage device, the computing environment includes a random access memory (RAM) that is useable by the processor(s) of the computing environment.

The input and output functions of the host device that can be used by an application that is running on the storage device can include any suitable such functions. Thus they may, and preferably do, include, input functions such as a key pad, touch screen and/or audio input, and outputs such as a screen and/or audio output. Preferably all of the available input and output functions of the host device can be used by an application that is running on the storage device.

In a particularly preferred embodiment, an application running on the storage device can interact with and make use of other functions of the host electronic device. In a preferred such arrangement, an application running on the storage device can use the network connections of the host device in order for applications running on the storage device to access the Internet. Other functions of a host device that it may be particularly desirable to use are resources that generate and/or collect data that may be useful to an application, such as GPS functions, sensor functions, a microphone, a camera, and a video decoder/encoder, etc., of the host device.

It will be appreciated that in order for an application that is running on the storage device to be able to interact with input and output functions of the host device, there will need to be a mechanism for the application to be able to communicate appropriately with the host device, and vice versa. Such communication could comprise, e.g., the sending of commands, content and/or other data to the host device (to the client module on the host device) and vice versa. For example, data to be sent from the slave host device to the master storage device may comprise, e.g., all data relating to key presses, network traffic, audio, video, gps, sensor inputs, etc.

The actual data that is communicated will depend on the application that is running on the storage device. For example, in the case of an, e.g., mapping application, key presses, internet traffic (streaming maps) and gps co-ordinates could be sent to the application on the storage device, which would then process the data and provide image data back to the client host device.

Similarly, data to be sent from the master storage device to the slave host device preferably comprises at least image data (for display) but could also comprise audio data for example. In other applications it could comprise GPS data (where the storage device incorporates a GPS function) or network data (where the storage device incorporates a network function), for example.

It would be possible, for example, to provide a special communications interface and/or arrangement between the storage device and the host device for the communication between the server module on the storage device and the client module on the host device.

However, the Applicants have recognised that a storage device of the type to which the present invention is applicable will need in any event to include a mechanism for transferring data to and from the storage device for its "normal" data storage operation, and that, moreover, any given host device will be configured to recognise the presence of such a storage device and to attempt to communicate with it accordingly (namely by acting, as discussed above, as a master accessing a slave storage device that is not assumed to contain any "intelligence" of its own).

The Applicants have further recognised that such arrangements can also be used for the necessary communication between the server module on the storage device and the client module on the host device in operation of the present invention.

Thus, in a particularly preferred embodiment, the existing storage device interface and communication protocol (i.e. that is provided for normal use of the storage device) is used for communication between an application on the storage device and the host device (for communication between the server on the storage device and the client on the host device).

Similarly, in a particularly preferred embodiment, the necessary communication between an application running on the storage device and the host device (e.g. between the server and client modules on the storage device and the host device, respectively) takes place via a data file input/output (read/write) mechanism that is provided for the transfer of data to and from the memory on the storage device (for its normal "mass storage" function). Thus, communication between the "master" storage device and the "slave" host device for the purpose of the present invention preferably takes place as appropriate (read/write) file accesses (data transfers) by the host device to the storage device, i.e. by means of the host device (the client on the host device) reading and writing files from and to the storage device using the conventional storage device interface and protocol.

This has the advantage that as such data transfer mechanisms will already be provided in any host and storage device system (for the purpose of storing data on and reading data from the storage provided on the storage device), the need to provide further communication arrangements and interfaces to provide the server and client operation for the present invention is avoided.

It also has the advantage that the normal "storage device" interface between the host and the storage device can straightforwardly be maintained, such that, for example, the host device will continue simply to assume and act as if there is storage device attached to it, and means that the present invention can be used with existing storage device systems.

It is believed that using file accesses in this manner for communication between a storage device that is acting as a master controlling a "slave" electronic device to which the storage device is coupled may be new and advantageous in its own right.

Thus, according to a fifth aspect of the present invention, there is provided a method of communicating between a slave function or functions on a host electronic device and a master function or functions on a storage device that is coupled to the host electronic device and that is controlling the slave function or functions on the host electronic device, the method comprising: using file input and output accesses by the host electronic device to the storage device to communicate between the master function or functions of the storage device and the slave function or functions of the host device.

According to a sixth aspect of the present invention, there is provided a system comprising: a host electronic device; and a storage device that is coupled to the host device; wherein: the storage device can act as a master device to control one or more slave functions on the host device; and the host electronic device is configured to, when the storage device is acting as a master device to control a slave function on the host device, use file input and output accesses to the storage device to communicate between the master storage device and the slave function on the host device.

As will be appreciated by those skilled in the art, these aspects and embodiments of the invention can and preferably do include any one or more or all of the preferred and optional features of the invention described herein, as appropriate. Thus, for example, the storage device is preferably a removable memory card, preferably an SD (including a micro SD) card. Similarly, the communication between the master storage device and the slave host device preferably comprises transferring commands, content and/or other data between the master storage device and the slave host device.

In a particularly preferred embodiment, the communication from the master storage device to the slave host device is achieved by the slave host device reading files (data) from the storage device, and communication from the slave host device to the master storage device is achieved by the slave host device writing files (data) to the storage device.

The files (data) that are read and written may comprise commands, content or other data for the server or client module, as appropriate. They are preferably seen as generic data transfers by the host device, with the server or client module then interpreting the data transfers as being commands, content or other data, as appropriate and as necessary.

The Applicants have recognised that in these aspects and arrangements, there may be a need for a mechanism to distinguish between normal data file input/outputs to and from the storage device (i.e. that are for the purpose of storing data on or reading data from the storage device in the normal manner) and those inputs and outputs that relate to the operation of an application that is running on the storage device (when the storage device is acting as a master controlling slave functions on the host device).

Most preferably, a normal data input and output can be identified (which results in the standard storage device behaviour (i.e. reads and writes to the mass storage on the storage device)), an input that is in fact a communication sent from the host device acting as a slave to an application running on the storage device can be identified (which results in that input being provided to the server module on the storage device for processing (which server module can in turn then provide the interpreted input to the appropriate resource in the application) (rather than it simply being stored in the memory of the storage device)), and an output that is in fact a communication from the server module on the storage device to the client module on the host device can be identified.

Any suitable mechanism can be used to distinguish and identify these different types of communication. In a particularly preferred embodiment, it is done by using the addresses associated with the reads and writes being performed. (In the case of an SD card, for example, data is transferred in blocks (typically of 512 bytes), and each block has a "block address" associated with it.) Preferably certain data addresses (e.g. block addresses) are associated with "normal" data transfers (such that reads and writes to those addresses result in normal storage device behaviour), and other addresses are associated with (set aside for) the respective server (master) and client (slave) operation communications discussed above. Then by causing the host device to write data to and read data from the appropriate addresses, communication between an application running on the storage device and the relevant slave functions on the host device can be facilitated.

Thus, in a particularly preferred embodiment, communication from the host device to or for an application that is running on the storage device is achieved by the host device writing data to a memory address or addresses that has been set aside for (associated with) such communication, such that when the server module on the storage device sees that data is being written to that address, it can identify that data as being a communication that needs to be processed for or provided to the application in question. (The data that is written to the address may comprise, as discussed above, e.g. commands, content or other data for the server and/or application(s).)

Similarly, in a particularly preferred embodiment, communication from an application that is running on the storage device to the client module of the host device is achieved by the client module causing the host device to read from a memory address or addresses that has been set aside for (associated with) such data transfers, such that when the server module on the storage device sees the host device attempting to read such an address or addresses, it can return the appropriate communications to the host device. (Again, the data that is returned in response to the read may comprise, e.g., commands, content or other data for the client module on the host device.)

Thus, in a particularly preferred embodiment, the client module of the host device, in order to transfer data and/or commands from the host device to the server module of the storage device, writes data to the storage device to an "input" address or addresses that has or have been predefined as being an address or addresses to be used for this purpose.

Similarly, the client module, in order to receive communications (data) that is intended for it from the server module of the storage device, reads data from an "output" address or addresses on the storage device that has or have been predefined as being an address or addresses to be used for that purpose. The server module then recognises such reads and transfers the appropriate data, etc., to the client module in response thereto. The client module will know that any read it does from an output address should contain data, etc., that is for it.

Thus in a particularly preferred embodiment, there is a set of allocated, preferably predefined, "input" addresses to which communications from the client module to the server module should be written by the client module and a set of allocated, preferably predefined, "output" addresses which the client module should read to receive communications from the server module. In this way the client module on the host device and the server module of the storage device can communicate by means of the client module causing the host device to read an output address or addresses and to write to an input address or addresses, as appropriate.

In a preferred arrangement of these aspects and embodiments of the invention, the particular "input" and "output" address arrangements are achieved by defining special files in the address area of the storage device, a predefined "output" file or files from which communications for the host device can be read and a predefined "input" file or files to which communications from the host device for the "master" function storage device should be written. Then, the client module on the host device can communicate with the server module of the storage device by reading an "output" file and writing to an "input" file, as appropriate. Such files may be created, for example, by the server module on the storage device manipulating the file access tables and directory tables for the storage device. There may be a single "output" and a single "input" file defined, or there may be plural input and/or output files.

It is preferred that these arrangements do not interfere with the normal mass storage operation of the storage device. Thus, there is preferably a set of addresses (a range of addresses) (an address space) that is used and set aside for the normal mass storage operation. Most preferably the input and output addresses used for the server/client communication are not in the address space of the mass storage part of the storage device (they may, in effect, be "virtual" addresses that do not physically exist in the mass storage part of the storage device).

Then, if the host device reads or writes to an address that is in the address space of the mass storage operation, the server module on the storage device will allow that operation to proceed as normal (as for the normal mass storage function of the storage device), but if the host device reads from or writes to an output or input address, the server module is configured to recognise that and act accordingly (in the case of a write to an input address, to send the data being written to appropriate functions in applications that are running on the storage device, and in the case of a read from an output address to provide any desired data to the client module of the host device).

It is similarly accordingly preferred that any files (data) to be transferred to the client module on the slave host device from the server module of the storage device are not stored in the normal mass storage area (e.g. non-volatile memory) provided on the storage device (although this could be done if desired), but are instead stored elsewhere on the storage device, for example and preferably in RAM, and/or otherwise buffered, on the storage device.

It will be appreciated that by means of these arrangements, the host device is able to operate in its normal fashion with respect to the storage device, namely simply to read or write files from and to specific addresses in accordance with the existing storage device format and protocol (e.g. for SD cards in the form of blocks of data with an SD specific protocol). However, the server module on the storage device can then identify, interpret and process the communication in question based on the address being read or written to. Thus, in effect, the host device is able to act as if it is simply reading and writing generic data in the normal fashion, with the server module then identifying data for the server/client operation based on the addresses used. For example, if the data is written to an address that is set aside for communications to the server module, the server module will interpret and process that data accordingly.

It will be appreciated that in these arrangements, in order for the server module on the storage device to communicate to the client module on the host device, the host device must read the relevant data (file) from the storage device. This may be achieved as desired. In a preferred embodiment, the client module is configured to read the relevant addresses (file(s)) periodically (i.e. to, in effect, "poll" the storage device periodically). This will ensure that the client module receives any communication for it from the server module at least at a minimum rate. The reading (polling) may take place at a fixed rate (at a fixed timing) or it could be varied (at a dynamic timing), e.g. depending on the application and circumstances in question.

The Applicants have further recognised that in systems where a host device operates to cache data that is read from a storage device, then such caching operation could interfere with the operation of the present invention. In particular, if the host device preferentially reads from its cache if it believes that it has the data already stored in its cache (e.g. from a previous read of the same memory address) (which is typical host device operation, as there is an assumption that the data stored on a storage device will be static), then the host device could fail to read data from the storage device if it thinks it has already read and cached data from the read address in question. In other words, there could be a risk that changes in the "output" file (for example) on the storage device would not be picked up by the client module on the host device, because the host device, if instructed to read from the output file (the output address(es)) again, will instead read from its cache (such that the read will not go back to the storage device), and thereby fail to pick up the new output file from the storage device.

In a particularly preferred embodiment therefore, steps are taken to help alleviate, and preferably to avoid, the possibility of this problem arising. In the case of a host device whose caching operation can be disabled, the client module is preferably configured to turn off the caching operation of the host device when operation in the manner of the present invention is required.

If this is not possible, and/or as an alternative, the relevant output data (output file(s)) storage and reading process is preferably configured in such a way so as to tend to trigger cache "misses" on the host device (to thereby force the host device to read from the storage device itself, not simply from its own cache). This may be, and in a preferred embodiment is, achieved by arranging the output data (file(s)) for the host device to read to be bigger than the size of the cache (such that the host device cannot keep all the data in its cache at once) and configuring the client module (the host device) to read the output data (from the output file) in a random order (so the host reads to a random position in the output data (file)). This should have the effect that any data to be read by the host device will tend to not be present in the cache, thereby triggering a cache "miss" and forcing the host device to read from the storage device itself.

In a particularly preferred embodiment, the client module on the host device is also or instead, and preferably also, configured to acknowledge data transfers that it receives from the server module on the storage device. This then allows the server module to identify whether the client module has received the data transfer or not. This provides another mechanism for ensuring that the client module on the host device has received all of the data to be transferred.

Most preferably, the server module continues to provide the same data to the client module when the client module attempts to read data from the storage device in use, until it receives the appropriate acknowledgement from the client module. In other words, the server module preferably keeps resending the same sequence of data to the client module until it receives an acknowledgement that that data has been successfully received. This again helps to ensure that the data transfer has been completed correctly. Thus, for example, if the server module is to send a sequence of four data packets to the client module, if it does not receive an acknowledgement after sending the fourth packet, it starts again at the first packet in the sequence, rather than starting a new data transfer, when it receives the next read from the client module (host device).

Such acknowledgements could be provided as desired. For example, the client module could be configured to send an acknowledgement message, e.g. in the form of a flag included with a data transfer, to the server module once it has correctly received a data transfer.

In a preferred embodiment, an implicit acknowledgement mechanism is used, whereby some other action of the client module also has the effect of implicitly acknowledging the data transfer to the server module. This has the advantage of avoiding the need for the client module to send an explicit acknowledgement message to the server module, thereby saving bandwidth.

Preferably such an implicit acknowledgement is given by the client module causing the host device to attempt to read a different output address (an address from a different output address range) on the storage device, with the server module then interpreting the fact that the client module (the host device) is now reading a different output address (or address range) as being an acknowledgement that the previous output address read has been successfully completed.

Thus, in a particularly preferred embodiment, there are two (or more) defined data address ranges (e.g. block address ranges) that are associated with (set aside for) data transfers from an application that is running on the storage device to the client module of the host device, and when the client module has successfully read a data transfer from one of the predefined address ranges, it then triggers the host device to read from another of the predefined output address ranges, with the server module then taking the change in output address range being read as an acknowledgement that the previous output address read has been successfully completed.

Such output address arrangements are preferably again achieved by defining two (or more) "output" files, each associated with a different address range, with the client module causing the host device to switch between reading the respective output files when it wishes to acknowledge safe receipt of a data transfer.

It is believed that such an acknowledgement mechanism may be new and advantageous in its own right.

Thus, according to a further aspect of the present invention, there is provided a method of transferring a batch of data from a storage device to an electronic device that is coupled to the storage device, the method comprising: the electronic device sending read requests to the storage device indicating an address or addresses in a first defined range of addresses, and the storage device returning data from a particular batch of data in response to such reads by the electronic device; the electronic device continuing to read addresses from the first range of addresses until such time as it has determined that it has received the batch of data correctly; and, when it has determined that it has received the batch of data correctly, then sending read requests to the storage device indicating an address or addresses in a second different defined range of addresses; and the storage device while the electronic device continues to read from an address in the first defined range of addresses, continuing to provide data from the particular batch of data to the electronic device, but when the electronic device changes to read an address in the second defined range of addresses, providing data from a different batch of data to the electronic device.

According to a another aspect of the present invention, there is provided a system comprising: a host electronic device; and a storage device that is coupled to the host electronic device via an interface between the host electronic device and the storage device; wherein: the electronic device is configured to send read requests to the storage device indicating an address or addresses in a first defined range of addresses, and the storage device is configured to return data from a particular batch of data in response to such reads by the electronic device; the electronic device is configured to continue to read addresses from the first range of addresses until such time as it has determined that it has received the particular batch of data correctly; and to, when it has determined that it has received the batch of data correctly, then send read requests to the storage device indicating an address or addresses in a second different defined range of addresses; and the storage device is configured to, while the electronic device continues to read from an address in the first defined range of addresses, continue to provide data from the particular batch of data to the electronic device, but to, when the electronic device changes to read an address in the second defined range of addresses, then provide data from a different batch of data to the electronic device.

As will be appreciated by those skilled in the art, these aspects of the invention can and preferably do include any one or more or all of the preferred and optional features of the invention discussed herein, as appropriate. Thus, for example, the storage device is preferably an SD card.

In a particularly preferred embodiment, the data transferred between the host device and the storage device is sent in the form of, preferably fixed size, discrete data units or packets. Preferably each such packet is an appropriate size for the storage device system in question. Thus, in the case of an SD card, for example, the data is preferably organised as and sent in the form of packets, each of which will fit into one 512 byte SD block.

Where, as may typically be the case, the host device is operable to read a batch of data comprising more than one packet (e.g. block) from the storage device each time it reads data from the portable memory device, then the server module preferably groups data to be transferred to the host device in appropriately sized batches for the host device to read. If necessary, the server module may pad the data batches with dummy data packets (dummy blocks), for example where there are no, or not enough, "real" data packets to be sent in response to a read by the host device.

Where the data transfers from the storage device to the host device are organised in this fashion, then preferably each individual data packet (e.g. data block in the case of a block based data transfer system (such as would, for example be the case with an SD card) within the batch is uniquely numbered (preferably in an increasing sequence). This then allows each data packet in the batch to be identified.

The client module on the host device preferably then checks the identification number of a packet which it receives to see if it has already processed that packet and if it has, discards the packet and send another read request (as if it receives a packet it has already seen, that could be because the read has come from the host device's cache, not the storage device).

In a particularly preferred embodiment, each data packet also indicates the size of the data batch (in terms of the numbers of data packets it contains) to which the data packet belongs. This further helps the client module to determine if it has received and processed a data batch from the server module correctly or not. Preferably, where an acknowledgement mechanism, as discussed above, is provided, the client module is configured to send an acknowledgement when it has received a complete batch correctly (rather than, for example, acknowledging each data packet individually).

The data packets preferably have a particular, preferably predefined, format. A different format may be, and in a preferred embodiment is, used for packets to the slave host device and for packets from the slave host device. For example, packets from the master storage device for the slave host device preferably include a packet identification (sequence number) and an indication of the number of packets in the batch in question, as discussed above, whereas this is not necessary for packets that are being sent from the slave host device to the master storage device (but such packets are in a preferred embodiment able to carry an acknowledgement, as discussed above).

In use of the present invention, a user could, for example, and in a preferred embodiment does, first activate the client module on the host device (e.g. by means of an appropriate key press). The client module may then send an appropriate "start" command to the server module in the storage device and begin to regularly read (poll) the relevant output address(es) on the storage device (so as to be able to receive the necessary communications from the server module).

When the server module receives the "start" command, it can activate the server operation, and, e.g., return a user interface screen to the host device for display to the user showing the applications available on the storage device. The user may then, e.g., select a desired application using the host device and the client module will then write an appropriate application "start" command, etc., to the storage device. The server module on the storage device will recognise this and start executing the application, and send appropriate user interface data (image and audio data) to the host device and receive appropriate user input data from the host device.

As discussed above, in the present invention data and commands, etc., will be communicated in an appropriate form or forms from the application processor on the storage device to the host device and vice versa.

The Applicants have recognised that there could be situations where the form of data and commands that will be used for communication between the host device and the storage device may not be the same as the form of data and commands that will be required by the application running on the storage device, and vice versa. Thus, there may be a need for the communication (e.g. data and commands) between the host device and storage device to be, in effect, converted or "translated" for communication appropriately to the application that is being executed, and vice versa.

Where such translation is required in the present invention, then it can be carried out in any suitable and desired manner. For example, any necessary communications interfacing and translation could be carried out on the application processor itself (e.g. by means of suitable software running on the application processor) or on the host device (e.g. by means of suitable software running on the host device).

In one preferred embodiment, any necessary communications interfacing and translation is carried out on the application processor itself (e.g. by means of suitable software running on the application processor). In this case, the computing environment on the storage device will comprise an application processing part comprising at least one application processor for executing the application on the storage device, and for interfacing between the application processor and the host device. The application processor preferably also executes the server module of the storage device.

In another particularly preferred embodiment of the present invention, the computing environment on the storage device comprises an application processing part comprising at least one application processor for executing the application on the storage device, and an interface processing part comprising at least one interface processor that is separate to the application processor, for interfacing between the application processor and the host device, the computing environment being configured such that communication between the host device and an application that is being executed on the application processor takes place via the interface processor.

Similarly, in a particularly preferred embodiment, the method of the present invention comprises using an application processing part of the computing environment on the storage device comprising at least one application processor for executing the application on the storage device, and using an interface processing part of the computing environment on the storage device comprising at least one interface processor that is separate to the application processor for interfacing between the application processor and the host device, such that communication between the host device and an application that is being executed on the application processor takes place via the interface processor.

In these embodiments of the present invention, the computing environment on the storage device includes both an application processor for executing the application itself, and a separate interface processor for interfacing between the application processor and the host device.

By carrying out the communication interfacing and translation on a separate interface processor on the storage device, the burden of that processing is removed from the application processor on the storage device. Similarly, it avoids the need to make any hardware or software changes for this purpose on the host device.

Using a separate interface processor in this manner can also, e.g., enhance the flexibility and scaleability of the system and provide other advantages.

In these embodiments of the present invention, the server module on the storage device may, e.g., be run on the application processor or on the interface processor, or distributed across both the application processor and the interface processor. In a particularly preferred embodiment it is run on the interface processor (i.e. the interface processing part performs the server functions on the storage device). This, inter alia, avoids burdening the application processor with the need to run the server module.

In these embodiments of the present invention, the application processing part of the computing environment on the storage device can comprise any suitable and desired components and elements. It should comprise at least a micro processor that is capable of executing the application or applications in question, running the server (if required), etc. In a preferred embodiment, the storage device has a general purpose CPU for this purpose, but it may also or instead have a more dedicated processor, such as a graphics processor.

The application processor may be any suitable such processor. An advantage of the embodiments of the present invention that have a separate interface processor (interface processing part) is that it can allow operation with any form of application processor and application processor operating system. In one preferred embodiment there is a single application processor on the storage device (in the application processing part of the computing environment on the storage device).

However, it would be possible for there to be plural application processors (which need not all be the same). Thus, in another preferred embodiment, the application processing part of the computing environment on the storage device includes plural application processors. In this case, the plural application processors preferably share, and communicate with the host device via, the same, single, interface processor (where provided). Where plural application processors are provided, there is at least a CPU (or some other form of more general processor) and a graphics processor (GPU).

In a particularly preferred embodiment, the application processing part comprises at least one CPU (or some other form of more general processor), and one or more of, and preferably all of, a graphics processor (GPU), debugging infrastructure, peripherals, power management, and clock control.

In the embodiments of the present invention that include an interface processing part, the interface processing part of the computing environment can similarly be configured in any suitable and desired manner, and take any suitable and desired form. It should at least comprise, as discussed above, a processor (which may be a CPU, dedicated hardware, etc., as desired) operable to interface (translate) between a communications protocol used between the host device and the storage device, and a communications protocol required or expected by an application being executed on the application processor. It should also have appropriate communications interfaces to the host device and to the application processing part of the computing environment on the storage device.

In these embodiments of the present invention, the interface (translation) function, e.g. of the interface processor, should be operable to take data received from the host device and convert it to the appropriate data structures that the application processor(s) uses, and vice-versa.

In a preferred embodiment, the interface function, e.g. interface processor, as well as being able to convert data between the protocol required for communication with the host device, and the protocol required by application processing element, is also able to encode and/or compress data to be sent to the host device. It can preferably also or instead, and preferably also, encode and/or compress data sent from the host device. This will then reduce the data transfer requirements for sending data to the host device (and/or for sending data received from the host device), and accordingly reduce power usage, for example.

In these embodiments of the present invention, the communications interface of the interface function, e.g. of the interface processing part, between the interface function (e.g. interface processing part) and the host device can take any suitable and desired form, e.g., depending upon the storage device and host device in question. As discussed above, it is preferably the normal interface that the host device would have with the storage device. Thus, in a preferred embodiment, the interface processing part (where provided) includes a mass storage communications interface (an interface that supports mass storage access from a host device) such as, and preferably, an SD or USB interface, for communicating with the host device.

In this arrangement, the interface function, e.g. interface processor, accordingly preferably translates between the application processor and the data protocol used between the storage device and the host device.

Where the computing environment includes a separate interface processing part, the communications interface between the interface processing part and the application processing part of the computing environment on the storage device could, e.g., comprise a direct interface (connections) between the interface processing part and the application processing part. However, in a particularly preferred embodiment, at least in the case of data communication, communication between the interface processing part and the application processing part takes place via shared memory, as opposed to any form of direct connection. This is advantageous from a hardware perspective and may also, e.g., facilitate enhanced security.

Thus, in a particularly preferred arrangement of the above embodiments of the invention, there is no direct data communications connection between the interface processing part and the application processing part of the computing environment, and the interface processing part includes appropriate elements and functionality for communicating with the application processing part via shared memory (and the application processing part correspondingly includes appropriate elements and functionality for communicating with the interface processing part via shared memory). Thus, the interface processing part preferably accesses data structures stored by the application processing part in a shared memory to receive communications from the application processing part and vice versa.

Thus, in a particularly preferred embodiment, the interface processing part is operable to fetch data structures that have been written to shared memory by the application processing part, and to process those data structures into a form suitable for transfer to the host device. Similarly, the interface processing part is preferably operable to process data structures received from the host device into a form suitable for transfer to the application processor and to write those data structures to shared memory for use by the application processing part.

Thus, in a particularly preferred embodiment of these arrangements of the present invention, the computing environment on the storage device also includes memory (shared system memory) that is to be and that is shared by the application processing part and the interface processing part, and that is used by the application processing part and the interface processing part to communicate with each other.

In these embodiments of the present invention, as well as communicating via a shared memory (or otherwise), in a particularly preferred embodiment, an interrupt mechanism is provided between the application processing part and the interface processing part of the computing environment on the storage device, to facilitate (trigger) communication between the application processor and the interface processor and vice versa. This interrupt mechanism may then be used, e.g., to cause the application processor to respond to inputs from the host device (the client side) that have been processed by the interface processor (and, e.g., placed in the shared memory).

Interrupts from the application processing part to the interface processing part, and vice versa, can be carried out in any suitable and desired manner.

Other arrangements would, of course, be possible. For example, it would also be possible to operate the system without having dedicated interrupts between the application processing part and the interface processing part, if desired, and to use other communications mechanisms between the application processing part and the interface processing part of the computing environment. For example, the application processing part and the interface processing part could be configured to poll or otherwise periodically check a specific part of the shared memory for information about new data (communications) to be delivered to or retrieved from the shared memory.

In a particularly preferred embodiment of these arrangements of the present invention, the interface processing part is operable to control, and controls, access to and from the mass storage, e.g. non volatile mass storage, of the storage device. In other words, the interface processing part preferably operates to provide the "normal" mass storage functionality of the storage device to the host device.

This can be achieved in any suitable and desired fashion. For example, the interface processing part may, and preferably does, include a suitable mass storage (non volatile memory) controller, such as a NAND or NOR flash device controller, or other controller that performs lower level access to a non volatile storage device. It may also or instead include (execute) a suitable mass storage device driver, such as an SD card controller driver.

Having the mass storage operation functionality on the interface processing part is advantageous because it avoids the need to provide this separately or via the application processing part.

Preferably, the interface processing part controls access to and from data storage (whether the mass storage or otherwise) on the storage device. Most preferably, all access to at least the mass storage on the storage device is controlled by the interface processing part (and preferably in respect of accesses by both the host device and by the application processing part to that storage). This can be used to enhance the security of the system, for example by preventing malicious code from being transferred from a host device to the application processing part and vice versa.

In these embodiments of the present invention, while it would be possible to enable (boot) both the application processor(s) and the interface processor(s) together (e.g. at power up), in a particularly preferred embodiment, the interface processor can be enabled (booted) independently of the application processor(s). Most preferably the interface processor is operable without the application processor(s) being enabled (booted). This then has the advantage that where the application processor(s) is not needed, e.g., because the host device simply requires mass storage operation and the interface processor alone is needed for (supports) that, then the application processor does not need to be enabled, thereby saving power, etc. This also means that the storage device can still be used as a normal storage device with host devices that are not enabled to use applications on the application processor of the storage device.

Thus, in a particularly preferred embodiment of these arrangements of the present invention, the system is configured so as to only enable (boot) the interface processor on the storage device at power up. This helps to ensure lower power usage.

The interface processor may be booted as desired. For example, and preferably, it may have a boot ROM and boot from that boot ROM. In a preferred embodiment, once it has started to boot, the interface processor preferably then continues to boot using data and code stored in the mass storage memory of the storage device, and/or using data and code stored on the host device and/or from over the Internet (e.g. where the relevant data is not yet stored in the memory on the storage device). This helps to allow the boot ROM for the interface processor to be as small as possible.

In a particularly preferred embodiment, the boot procedure for the interface processor carries out a number of authentication (security) checks as part of its process, and either continues with or aborts the boot procedure depending upon the outcome of those authentication checks.

The application processor is preferably then enabled (booted) at a later time, preferably in response to (and preferably only in response to) some event that indicates a need for the application processor. The triggering event may, e.g., be, and preferably is, an appropriate user input on the host device, such as the activation of a client application on the host device. In response to this, the system will then start to boot the application processor on the storage device. The application processor is preferably booted by means of the interface processor giving the relevant mass storage boot address to the application processor.

The interface processor is preferably also configured to handle any necessary initialisation and handshaking with the host device.

As discussed above, an advantage of the embodiments of the present invention that use a separate interface processor is that they facilitate the use of application processors for executing applications on a storage device coupled to a host device without the need for significant changes or modifications to the application processor itself (and, indeed, in preferred embodiments at least, require minimal, if any, changes or additions to the application processor(s)). However, the present embodiments do not preclude there being some changes or additions to the application processor, for example where that may be advantageous or required to allow the system to operate. Thus, for example, where appropriate, it is preferred to provide and execute a driver for the interface processor on the application processor(s), to allow the application processor to drive the interface processor (and the present embodiments encompass such arrangements).

The present invention can be used in any microprocessor based system that uses storage devices to provide mass storage to the system. It is particularly advantageous for use in smaller and portable electronic devices that may have more limited resources. Thus it can in particular be used with portable and handheld devices, such as PDAs, mobile telephones, gaming devices, etc.

The various functions, modules and elements of the present invention can be carried out and implemented in any desired and suitable manner. For example, the functions of the present invention can be implemented in hardware or software, as desired. Thus, for example, the invention may comprise a suitable processor or processors, functional units, circuitry, processing logic, microprocessor arrangements, etc., that are operable to perform the various functions, etc., such as appropriately dedicated hardware elements and/or programmable hardware elements that can be programmed to operate in the desired manner.

Similarly, the computing environment and flash memory (mass storage) element, etc., can be physically arranged as desired on the storage device. For example, although in a preferred embodiment the computing environment is provided as a separate chip or chips to the flash memory element on the storage device, it would be possible to integrate the flash memory and the computing environment in a single chip, if desired. Similarly, the components of the computing environment, such as the application processing part, the interface processing part, the flash memory controller, etc., could all be provided on a single chip, or each as separate chips, or as any other suitable combination of chips, as desired.

As will be appreciated by those skilled in the art, all of the described aspects and embodiments of the present invention can include, as appropriate, any one or more or all of the preferred and optional features described herein.

The methods in accordance with the present invention may be implemented at least partially using software e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

The invention also extends to a computer software carrier comprising such software which when used to operate a microprocessor system comprising data processing means causes in conjunction with said data processing means said system to carry out the steps of the methods of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions fixed on a tangible medium, such as a non-transitory computer readable medium, for example, diskette, CD ROM, ROM, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

BRIEF DESCRIPTION OF THE DRAWINGS

A number of preferred embodiments of the present invention will now be described by way of example only and with reference to the accompanying drawings, in which.

DETAILED DESCRIPTION

Figure 1:
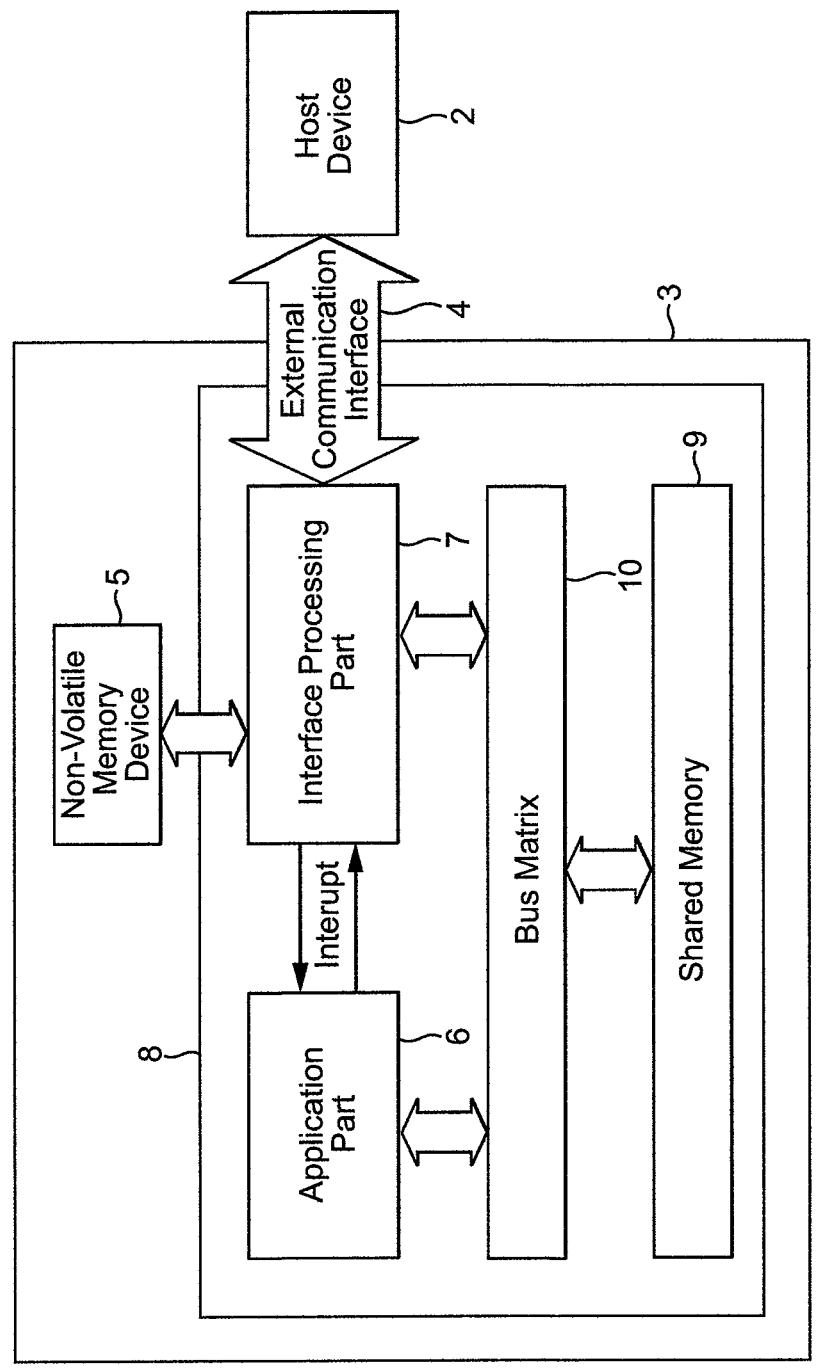
FIG. 1 shows schematically an embodiment of the present invention.

FIG. 1 shows an exemplary embodiment of a system that can be operated in accordance with the present invention. The system comprises a host electronic device 2 which in the present embodiment is a mobile phone, and a storage device 3, which in the present embodiment is in the form of an SD memory card, that is coupled to the host device 2.

Other host devices and storage devices would, of course, be possible. For example the host device may be a camera, a portable entertainment device, a PDA, a personal navigation device, an in car navigation or entertainment system, a PC, an appliance such as a TV, printer or washing machine, etc. Similarly, the storage device could, for example, be a hard drive, a flash drive, or a USB memory stick.

As shown in FIG. 1, the memory card (storage device) 3 and the host device 2 communicate with each other via an appropriate device host interface 4. In the present embodiment they communicate over a wired interface, as the memory card (storage device) 3 is received in a suitable SD card slot in the host device 2. Other arrangements, including a wireless link between the host 2 and the memory card would be possible if desired. The host device 2 and memory card communicate with each other using the appropriate SD card communication protocol.

The memory card (storage device) 3 further includes, as is known in the art, a flash (non-volatile) memory element 5 for providing mass storage functionality for the host device 2.

As shown in FIG. 1, the storage device 3 also includes a computing environment 8, which in this embodiment comprises an application processing part 6, a separate interface processing part 7, and a shared memory 9 for use by the application processing part 6 and the interface processing part 7 via a bus matrix 10 to communicate with each other. The computing environment 8 also includes a random access memory (RAM) that is usable by the processors of the computing environment.

In the present embodiment, the computing environment 8 is provided on a separate chip, with the flash memory element 5, for example, also being provided as a separate chip, with the various chips then being appropriately connected together and mounted on, in this case, an appropriate SD card (or micro SD card) substrate. Other arrangements, such as providing the computing environment 8, and flash memory element 5, etc., all on the same chip, or providing the components of the computing environment 8, such as the application processing part and the interface processing part, each as separate chips, would equally be possible, if desired.

The application processing part 6 of the computing environment 8 of the present embodiment comprises at least one CPU (or some other form of more general processor), a graphics processor (GPU), an internal RAM, debugging infrastructure, peripherals, power management, and clock control.

The application processing part 6 of the computing environment 8 is operable to execute one or more applications on the storage device 3. The applications may be stored, for example, in the flash memory element 5 of the storage device 3 and then loaded appropriately into the RAM of the application processing part 6 when they are to be executed. Applications can also be executed from the shared memory or directly from the flash memory.

The applications that may be executed in the application processing part 6 of the computing environment 8 of the storage device 3 may comprise any suitable and desired applications, such as games, productivity applications such as spreadsheets or word processors, Internet browsers, e mail clients, video and audio editing tools, Internet applications, user interface applications such as stock viewers, weather programs, flight schedules, etc. The application processing part 6 could execute plural applications simultaneously and/or support plural applications, if desired.

In the present embodiment, the application processor or processors of the application processing part 6 also execute a driver for communication with the interface processing part 7, to allow the application processor to communicate with the interface processor. The interface processing part 7 is self standing and all communication with the application processing part 6 is done via shared memory.

The interface processing part 7 of the computing environment 8 is a processing component that facilitates in particular transparent data communication between the host device 2 and the application processing part (system) 6. This then enables the application processing part 6 to provide additional computing power to the host device 7 through the mass storage communications interface 4 between the host device 2 and the storage device 3. In the present embodiment, as will be discussed further below, the interface processing part 7 is also configured so as to allow the host device 2 to access the normal mass storage functions 5 of the storage device 3 with minimal power consumption.

Thus, as well as its communication with the application processing part 6 of the computing environment 8 (which will be discussed in more detail below), the interface processing part 7 of the computing environment 8 is also able to communicate with the host device 2 and the normal flash memory element 5 of the storage device 3. It accordingly has appropriate communications interfaces to the host device 2, and to the non volatile memory element 5, and to the application processing part 6 of the computing environment 8 of the storage device 3.

In the present embodiment, the interface processing part 7 of the computing environment 8 on the storage device 3 performs the following functions: transfer of data between the host device 2 and the application processing part 6 of the storage device; memory card mode handling for the host device; initialization of the application processor in the application processing part 6; initialization and handshaking with the host device 2; and providing the nonvolatile storage device functions to the host device 2.

To achieve this, in the present embodiment, the interface processing part 7 of the computing environment 8 on the storage device 3 includes: a CPU or other controller able to control the components of the interface processing part 7, carry out initialisation and handshaking functions, etc.; an external interface controller to the host device (in the present embodiment, as the storage device 3 is an SD card, this interface controller comprises a SecureDigital controller; however a USB or other interface supporting mass storage access from a host device controller could be used, if desired, depending upon the nature of the storage device); a non volatile memory controller (this can, e.g., be a NAND flash device controller, NOR flash controller or other controller that performs lower level access to a non volatile storage device); some internal system memory (for use as working space memory); a debugging infrastructure (such as jtag, uart etc.); a component for compression and encoding of video, audio or data; a boot ROM for booting of the system and storing application code; an interrupt controller with connection to all the application processor interrupt sources and internal interrupt sources; and some secure storage for storing authentication keys to be used to secure the boot procedure (not shown).

Other arrangements, and functionality, etc., for the interface processing part 7 of the computing environment 8 of the storage device 3 would, of course, be possible.

The interface processing part 7 of the computing environment 8 also includes, as discussed above, a processor (which may be a CPU, dedicated hardware, etc., as desired) operable to interface (translate) between a communications protocol used between the host device 2 and the storage device 3, and a communications protocol required or expected by an application being executed on the application processor in the application processing part 6 of the storage device 3. This interface processor may be the same as or different to the processor (e.g. CPU) that controls the components of the interface processing part 7.

The interface (translation) function of the interface processor is operable to take data received from the host device and convert it to the appropriate data structures that the application processor(s) uses, and vice-versa. Thus, the interface processor accordingly translates between the application processor and the data protocol used between the storage device 3 and the host device 2.

In the present embodiment, the interface processor, as well as being able to convert data between the protocol required for communication with the host device, and the protocol required by application processing part, is also able to encode and/or compress data to be sent to the host device. This reduces the data transfer requirements for sending data to the host device 2, and accordingly reduces power usage, for example.

In the present embodiment, the communications interface part between the interface processing part 7 and the host device 2 comprises a mass storage communications interface (an interface that supports mass storage access from a host device) in the form of an SD interface (other arrangements, such as a USB interface for communicating with the host device could be used, e.g. depending upon the nature of the storage device 3).

In the present embodiment, communication between the interface processing part 7 and the application processing part 6 of the computing environment 8 of the storage device 3 takes place, as shown, via shared memory 9. This is advantageous from a hardware perspective and may also, e.g., facilitate enhanced security.

Thus, the interface processing part 7 of the storage device 3 includes appropriate elements and functionality for communicating with the application processing part via the shared memory 9, and the application processing part 6 correspondingly includes appropriate elements and functionality for communicating with the interface processing part via the shared memory 9. Thus, the interface processing part 7 accesses data structures stored by the application processing part 6 in the shared memory 9 to receive communications from the application processing part 6 and vice versa.

Thus, in the present embodiment, the interface processing part 7 is operable to fetch data structures that have been written to the shared memory 9 by the application processing part 6, and to process those data structures into a form suitable for transfer to the host device 2, and is operable to process data structures received from the host device 2 into a form suitable for transfer to the application processor 6 and to write those data structures to the shared memory 9 for use by the application processing part 6.

An interrupt mechanism is also provided between the application processing part 6 and the interface processing part 7 of the computing environment 8 on the storage device 3, to facilitate communication between the application processor and the interface processor and vice versa. This interrupt mechanism may then be used, e.g., to cause the application processor to respond to inputs from the host device 2 (the client side) that have been processed by the interface processor (and, e.g., placed in the shared memory 9).

The interface processing part 7 accordingly includes an interrupt controller, which interrupt controller is coupled to all the interrupt sources of the application processing part 6, and all the internal interrupt sources of the interface processing part 7.

In the present embodiment, interrupts from the application processing part 6 to the interface processing part 7 are carried out by having all the application processor interrupts available on the interrupt controller of the interface processing part 7.

Other arrangements would be possible. For example, the application processor interrupts could also or instead be handled by the application processor interrupt controller, with interrupts needed for the interface processing part 7 being raised by writing to an interface processing part register. It would also or instead be possible, e.g., to have an extra interrupt controller in the application processing part 6 that groups all interrupts to the interface processing part 7, and makes all application processing part interrupts available to the interface processing part.

The interface processing part 7 has the ability to interrupt the application processing part 6 via an interrupt signal exiting from the interface processing part.

In this way, the interface processor in the interface processing part 7 communicates with the application processor in the application processing part 6 of the computing environment 8 via interrupts and the shared memory 9.

Where the interface processing part includes separate controller component (such as an SD controller, a flash controller, etc.) inside the interface processing part, then the application processing part can preferably access these components.

The components of the interface processing part, such as the nand flash controller, physical interface controller, etc. are accessed by the application processing part over a shared bus. Access from the application processing part to these components is controlled by the interface processing part.

As discussed above, in the present embodiment, the interface processing part 7 controls access to and from the non volatile mass storage 5 of the storage device 3. Thus, the interface processing part 7 provides the "normal" mass storage functionality of the storage device 3 to the host device 2.

To do this, the interface processing part 7 includes a suitable mass storage (non volatile memory) controller, such as a NAND or NOR flash device controller, or other controller that performs lower level access to a non volatile storage device. It also executes a suitable mass storage device driver, which in this embodiment is an SD card controller driver.

In the present embodiment, the interface processing part 7 controls access by the application processing part 6 to areas of the mass storage (flash memory) 5 on the storage device 3, and controls access by the host device 2 to areas of the mass storage (flash memory) 5 on the storage device 3.

This has the effect that all access to the mass storage 5 on the storage device 3 requires permission of the interface processing part 7, such that the interface processing part accordingly acts as a firewall between the host device 2 and the mass storage 5 on the storage device 3, and between the application processing part 6 and the mass storage 5 on the storage device 3. This can enhance the security of the system, for example by preventing malicious code from being transferred from a host device to the application processing part and vice versa.

The computing environment 8 is configured so as to only enable (boot) the interface processor (the interface processing part 7) on the storage device 3 at power up. This helps to ensure lower power usage. It also has the advantage that where the application processor(s) is not needed, e.g., because the host device 2 simply requires mass storage operation, then the application processor does not need to be enabled, thereby saving power, etc. (as the interface processor alone supports that).

Also, only a minimum of components run at power up and the interface processor runs at a lower clock frequency until it receives a request for more performance (at which point it can then increase the clock frequency, control the power controller, etc., to provide increased performance).

The interface processor (the interface processing part 7) may be booted as desired. In the present embodiment, the interface processing part 7 has a boot ROM and boots from that boot ROM. Once it has started to boot, the interface processor then continues to boot using data and code stored in the mass storage memory 5 of the storage device 3. It can also use data and code stored on the host device 3 and/or from over the Internet for this, if required (e.g. where the relevant data is not yet stored in the memory 5 on the storage device).

Figure 11:
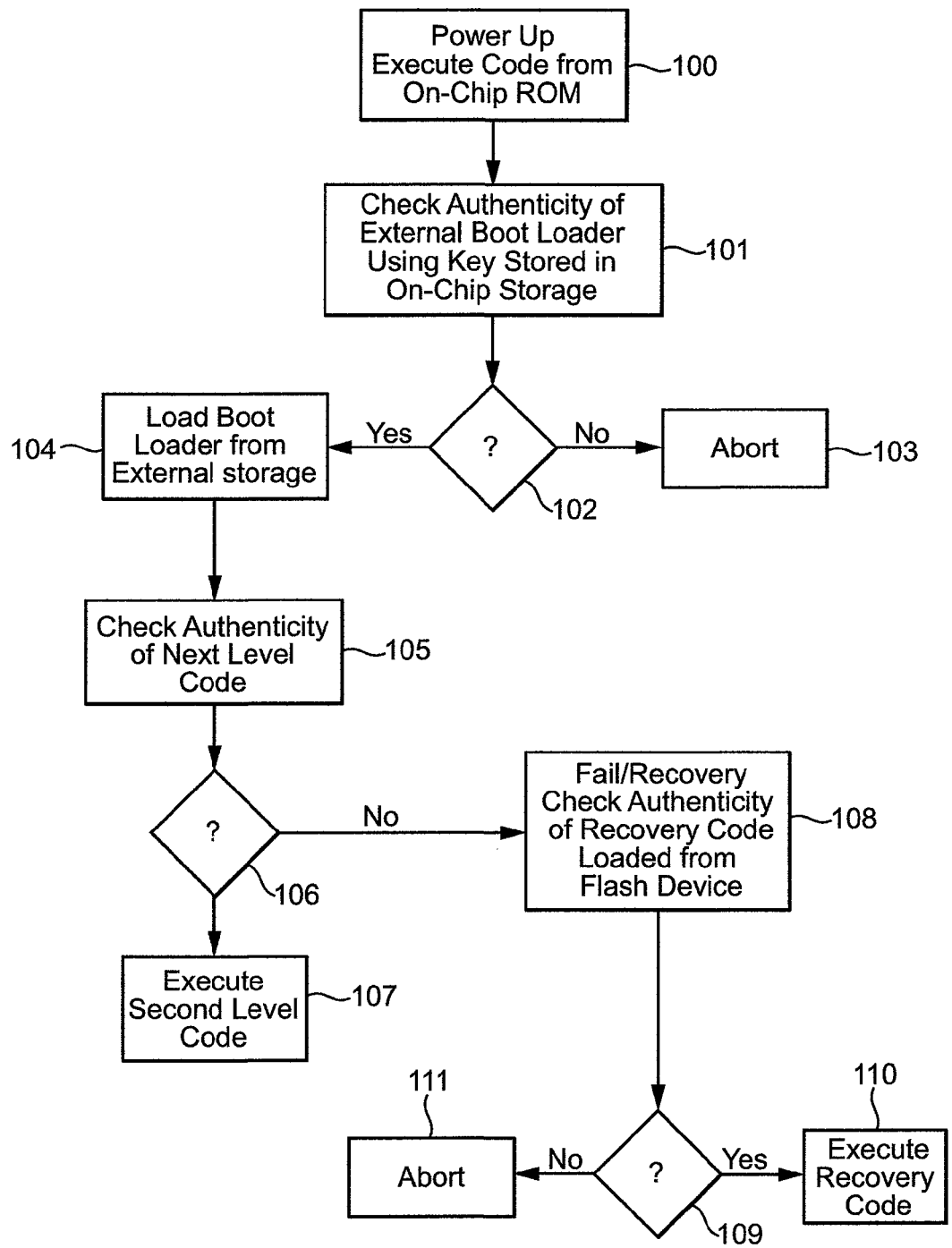
FIG. 11 shows the boot sequence used for the interface processing part in the embodiment shown in FIG. 1.

FIG. 11 shows the procedure that is used for booting the interface processing part 7 in the present embodiment in more detail.

As shown in FIG. 11, when the interface processing part is first powered up, it will proceed to execute boot code that is stored in the boot ROM that is present in the interface processing part 7 to start the boot procedure (step 100).

Once this boot code has been executed, the interface processing part 7 then checks the authenticity of the boot loader data and code that is stored in the external mass storage memory 5 of the storage device 3 (step 101). In the present embodiment this is done by reading a public authentication key that is stored with the boot loader code in the mass storage memory 5 of the storage device 3, and then comparing that authentication key (or, e.g., a hash of that key) with a copy of the key (or of a hash of the key, respectively) that is already contained in a secure storage section of the boot ROM of the interface processing part 7.

If this authenticity check (step 102) indicates that the keys (or the hashes of the key) do not match, then the boot procedure is aborted (step 103). This is because if the authentication check is not successful, that would suggest that the boot code in the mass storage memory 5 of the storage device 3 has been modified or otherwise interfered with, and therefore that security has potentially been breached.

On the other hand, if the authenticity (security) check (step 102) is successful, then the interface processing part 7 can proceed to load and execute the boot loader data and code from the mass storage memory 5 of the storage device 3 to continue with the boot procedure (step 104).

When the next level of boot loader code (such as, e.g., kernel, OS or special application code) is to be executed, a further authenticity (security) check for that next level of boot code is performed (step 105). This authentication check again preferably comprises comparing a key or a hash of a key that is stored in association with the next level of boot code in the mass storage memory 5 of the storage device 3 with a corresponding version of that key (or hash of that key) that is stored in the secure storage of the interface processing part 7.

If this security check (step 106) is successful, then the boot procedure will proceed to execute the second level boot code stored in the mass storage memory 5 of the storage device 3 (step 107), after which the boot procedure is completed and the interface processing part 7 will be enabled.

At this stage, for example, a kernel stored in the mass storage memory 5 of the storage device 3 will mount file systems according to the desired set up, and continue with user space initialisation. This will then start the necessary applications and GUI for the device to become enabled.

If the second level of boot code authenticity check fails at step 105, then the interface processing part enters a recovery boot procedure (step 108).

In the recovery boot procedure, the system can attempt a recovery boot. In this arrangement, the interface processing part 7 attempts to boot from a rescue image (comprising boot loader code and data) that is provided on a further external storage device, such as an SD card, that may be provided by the user and coupled to the storage device 3. Again, if an attempt to boot using this rescue image is to be made, the interface processing part 7 first carries out an authentication check to determine whether an authentication key (or a hash of that key) that is stored in the boot rescue image on the external storage device matches the key (or hash) value stored in the boot ROM of the interface processing part 7. (The authentication key that is stored in the boot rescue image may be a signature that is generated from a secure private key, for example.)

If this authentication procedure (step 109) is successful (thereby indicating that the rescue image on the external storage device has not been tampered with), then the interface processing part proceeds to execute the recovery code (step 110) on the external storage device and proceeds with the normal boot procedure using the rescue image in the manner described above.

The rescue image (boot code and data) could, e.g., be executed directly from the external storage device, or it could, e.g., be loaded from the external storage device on to the storage device 3, by copying the rescue image from the external storage device to the mass storage memory 5 of the storage device 3, and then, once the rescue image has been copied to the mass storage memory 5 of the storage device 3, the system could proceed with the normal boot procedure using the rescue image copied to the mass storage memory 5 of the storage device 3 in the manner described above.

If the check of the rescue image on the external storage device fails, then the procedure is aborted (step 111).

This latter recovery procedure (i.e. executing a rescue image from an external storage device and then proceeding to boot from that rescue image), can also be used, if desired, for initial booting of the system for the first time, in the situation where, for example, there is no boot data and code yet stored in the mass storage memory 5 of the storage device 3, or for system recovery or system maintenance. In these arrangements, the "rescue image" could, e.g., be copied to the mass storage memory 5 of the storage device 3, so that the system can subsequently be booted from boot code and data that is stored in the mass storage memory 5 of the storage device 3.

The application processor (the application processing part 6) is enabled (booted) at a later time, after the interface processor (the interface processing part 7) has been booted, and only in response to some event that indicates a need for the application processor (for the application processing part 6). In the present embodiment, the triggering event is an appropriate user input on the host device, such as the activation of a client application on the host device. In response to this, the system will then start to boot the application processor (the application processing part 6) on the storage device 3. The application processor is preferably booted by means of the interface processor giving the relevant mass storage boot address to the application processor.

Thus, in the present embodiment, the computing environment 8 on the storage device is enabled (booted) in two stages, firstly (at power up) to a mass storage operation mode by booting the interface processor only, and, if required, then, in a second, subsequent stage, to a full application processing mode by booting the application processor(s). (Other arrangements would, of course be possible.)

In the present embodiment, the storage device 3 is also configured such that the application processor (the application processing part 6) will only be enabled (booted) if the coupled host device 2 can provide the necessary power, performance, etc. to support such operation.

As well as supporting the execution of an application on the storage device 3, the computing environment 8 of the storage device 3 is operable to execute a set of software components that together provide a server module (a server function) on the storage device 3. There is a corresponding set of client software components on the host device 2 that together provide a client module (a client function) on the host device 2 that can cooperate with the server module (function) on the storage device 3 to allow an application that is being executed in the computing environment 8 of the storage device 3 to access and use, inter alia, input and output functions of the host device 2. In effect, the server components running in the computing environment 8 constitute a server module that allows the storage device 3 to act as a master controlling functions of the host device 2, via a corresponding client module formed by the client components of the host device 2. The arrangement is such that the host device 2 can act as a thin client providing user input and output functions and connectivity with the Internet for an application that is running in the computing environment 8 on the storage device 3.

In the present embodiment, the server module is executed in the interface processor on the interface processing part 7 of the computing environment 8 (i.e. the interface processing part provides the server function on the storage device 3). This avoids stealing any performance from the application processor and the application processing part 6 for performing the server function. However, other arrangements, such as running the server module in the application processor in the application processing part 6, or in a distributed fashion across both the interface processing part 7 and the application processing part 6 on the storage device 3 would be possible, if desired.

The operation of the server module and client module in the present embodiment will now be described.

Figure 2:
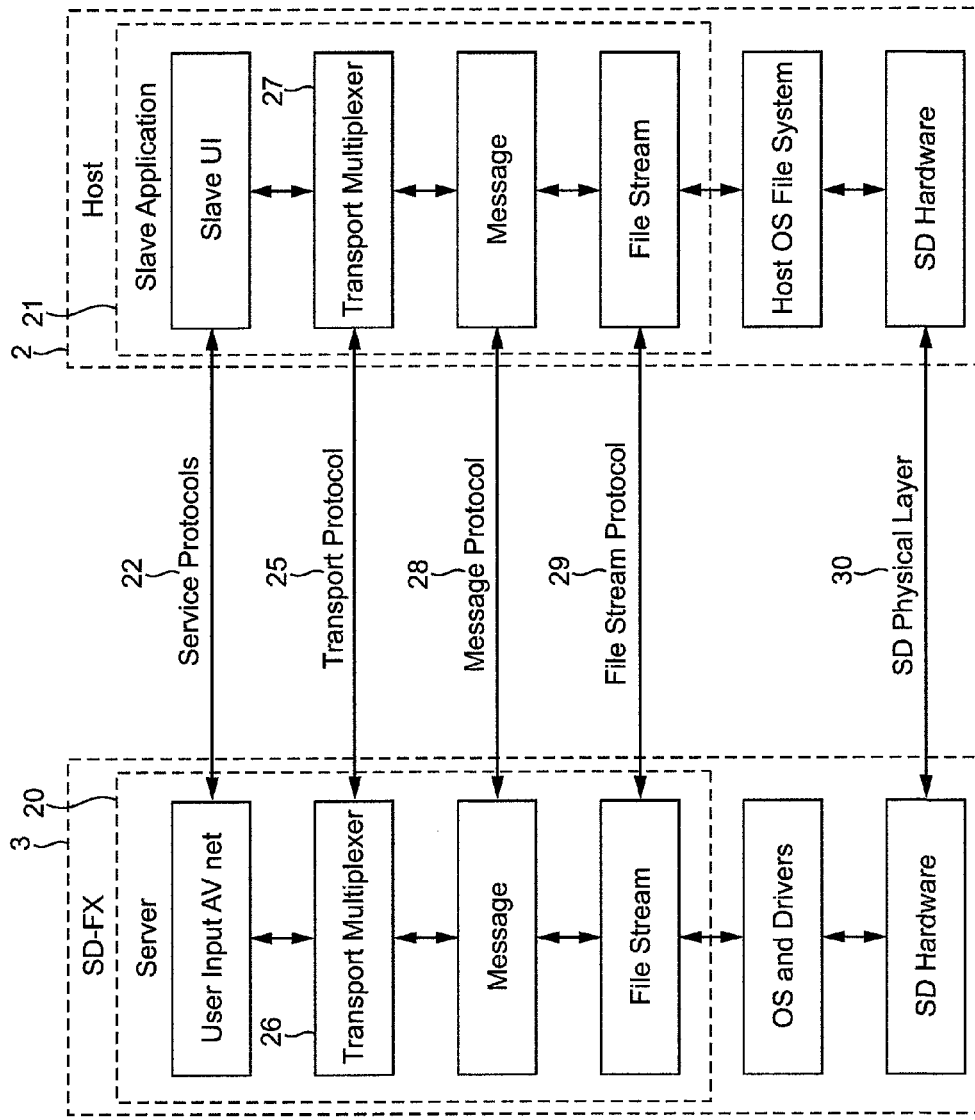
FIG. 2 shows schematically a protocol stack used in the embodiment shown in FIG. 1.

FIG. 2 shows schematically the relevant server 20 and client 21 software stack and protocols that are provided on the storage device 3 and the host device 2, respectively. The software running in the computing environment 8 of the storage device 3 (in the interface processing part 6 of the computing environment 8 in the present embodiment) acts as the "master" and the client software running on the host device is the corresponding "slave". Communications between the respective layers of the protocol stack over a defined protocol are shown with dashed lines in FIG. 2, while actual physical communication paths are shown with solid lines.

As shown in FIG. 2, the top protocol layer is the service layer 22.

Each application that may be executed on the storage device 3 has access to an API which provides all operating system and input/output functionality for the application. The API is implemented either as shared or static libraries and therefore runs in the same context as the application.

The API libraries provide the service protocol layer 22 which is a set of protocols for different services which the client module on the host device will provide for the application that is running on the storage device, such as access to the display, buttons and Internet on the host device (in effect, a slave user interface, etc., on the host device). In the present embodiment, each service is one specific functionality, such as graphics output or key press events.

Each service has a defined service protocol, and represents a certain capability, such as a key input service. In operation, when a service is in use, a "channel" linked to the service is opened through which, for example, events relating to the service can be sent and received. For example, if a slave host device registers a key input service, the master server component on the storage device can open a channel linked to that key input service and then receive key input events through that channel. Several channels can be opened to the same service (and all channels must be linked to a service).

The next layer down in the protocol stack is the transport protocol layer 25. There is a corresponding transport multiplexer component 26, 27 in the server module 20 on the storage device 3 and in the client module 21 on the host device 2.

The transport protocol layer 25 acts to combine the plural individual service channels of the service protocol layer 22 into a single channel for communications that are passing down the protocol stack from the service protocol layer, and, correspondingly, acts to de multiplex the single "channel" that it will receive from the lower message protocol layer 28 (which will be discussed further below) into the appropriate number of individual channels needed for the service layer 22. The latter is accomplished by tagging messages received from the message protocol layer 28 with the appropriate channel numbers.

The protocol layer below the transport protocol layer 25 is the message protocol layer 28. The purpose of this protocol is to provide the higher layers of the protocol stack with the possibility of sending and receiving messages of arbitrary length (whereas, as will be discussed further below, the lower layers of the protocol stack are constrained to send messages of fixed, or at least predetermined, length).

The message protocol uses message protocol packets which have the following structure:
- bytes 0-3: number of bytes in the payload
- bytes 4-7: number of FAT stream packets this message is composed from
- bytes 8-: payload.

To do this, the message protocol operates to segment messages that it receives from the higher layers (from the transport protocol layer 25) into the FAT stream packets that the lower file stream protocol layer 29 uses (as will be discussed further below), and, similarly, for communications received from the file stream protocol layer 29 for provision to the higher layers, acts to concatenate the FAT stream packets that it receives from the file stream protocol layer 29 into longer messages.

The next layer down the protocol stack is the file stream protocol layer 29. The purpose of this layer is to make sure that the packet transport over the SD physical layer 30 (which is the actual physical communication medium that is used between the server module on the storage device 3 and the client module on the host device 2) is reliable and efficient. The communication arrangement over the SD physical layer 30 will therefore first be described, before returning to a more detailed description of the file stream protocol 29.

As shown in FIG. 2, the physical communication between the storage device 3 and the host electronic device 2 takes place via the SD interface (the SD physical layer) (as the storage device 3 is in this embodiment an SD card). This physical layer is used for all communications between the storage device 3 and the host device 2, including the communication between the storage device 3 and the host device 2 when the storage device 3 is acting as a master to the host device 2. This has the advantage that the host device 2 and storage device 3 continue to operate in their normal fashion with respect to the physical layer, notwithstanding that the host device 2 may in fact be acting as a slave for an application that is running on the storage device 3.

The SD physical layer 30 follows the SD standard. Thus, as known in the art, in the present embodiment, communication between the storage device 3, and the host device 2, including all communications relating to the client and server operation, takes place via data transfers of blocks of 512 bytes, with each block having an address, starting at 0 and increasing, in accordance with the SD protocol.

As in normal SD card operation the memory card storage device 3 would handle every block address as either a read or write to the corresponding block in the flash memory element 5, in the present embodiment the block addresses that the host device 2 may read from or write to are classified into three different types, such that depending upon which address the host device is reading from or writing to, the storage device (namely the server module on the storage device) can interpret that data transfer accordingly.

The first type of block address is any block address that is in the address space of the flash storage area 5 of the storage device 3. If the host device reads from or writes to such a block address, then the server module on the storage device 3 allows the normal SD card operation to be carried out (namely a read of or write to the appropriate flash storage area). Blocks having these addresses can accordingly be thought of as "normal" blocks.

However, in order to facilitate the server/client operation of the present embodiment, two further types of block address defined and that, in particular, the server module on the storage device 3 can recognise.

The first such block address is an "input" block address. If the server module on the storage device 3 sees the host device 2 writing to such an "input" block address, that is interpreted by the server module on the storage device 3 as being a data transfer from the client module on the host device for processing by the server module on the storage device 3. The server module 3 is accordingly configured to recognise when the host device writes blocks to an "input" block address and in response thereto to pass the blocks for processing by the higher levels of the server module protocol stack. This then allows the client module on the host device 2 to send communications for the server module (for an application being executed on the storage device 3) on the storage device 3 by writing blocks to the defined input block addresses.

There is correspondingly a defined set of "output" block addresses. These addresses are used for communication from the server module on the storage device 3 to the client module on the host device 2. When the server module on the storage device 3 sees the host device 2 reading from one of the defined "output" block addresses, the server module on the storage device 3 again intercepts that "read" and transfers the next waiting messages from the higher levels of the server module protocol stack to the host device 2 (to the client module on the host device 2). (The client module "knows" that it has read an output address and so treats any data transferred in response to that read as data that it should process.)

Figure 3:
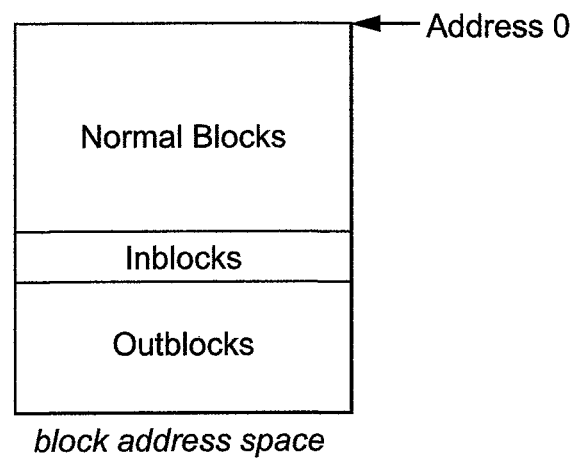
FIG. 3 shows schematically the block address space on the storage device of the embodiment shown in FIG. 1.

FIG. 3 shows schematically the above block address space arrangement on the storage device 3.

The "normal blocks" have addresses within the normal address space of the flash memory element 5 on the storage device 3, and, as discussed above, any read or write to such a normal block address results in the same behaviour as would normally be the case for the storage device 3, namely appropriate reads or writes to the flash storage area 5.

The input block and output block addresses shown in FIG. 3 are, on the other hand, not within the normal address space of the flash memory element 5, but are instead, in effect, "virtual" addresses that are used to trigger the transfer of data between the server and client modules on the storage device 3 and the host device 2. Thus, as discussed above, writes to input block addresses and reads of output block addresses by the host device 2 do not result in writes to or reads of, respectively, corresponding block addresses in the flash storage element 5, but are instead "intercepted" by the server module on the storage device 3 and interpreted appropriately either as communications from the client module to the server module or requests from the client module to receive communications from the server module (with the server module then responding appropriately).

To facilitate the above "input" and "output" block address operation, two special files are created by the server module on the storage device 3 through manipulation of the file access tables and directory tables in the flash storage area 5 of the storage device.

One of these files, called in the present embodiment /fxiout.str, has all the output blocks allocated to it, such that any read from this file will result in a read from an output block (and so is used for communication from the server module on the storage device to the client module on the host electronic device).

The other file, called in the present embodiment /fxiin.str, has all the input blocks allocated to it, such that any write to this file will result in a write to an input block (and so is used for communications from the client module on the host device to the server module on the storage device).

In this way, the client module on the host electronic device can read /fxiout.str or write to /fxiin.str in order to communicate with the server module on the storage device 3.

The above describes the data transfer protocol for the physical layer 30. However, the Applicants have recognised that it may be necessary to take steps to ensure that the data transport over the physical layer 30 in the manner discussed above is reliable and efficient. As discussed above, this is the function of the file stream protocol layer 29.

The file stream protocol 29 transfers data between the client and server modules in the form of file stream packets. Each file stream packet fits into one 512 byte SD block and includes a packet header and a payload. The payload is the useful data that is being transferred between the server module and the client module and can comprise, for example, commands, content or other data. (As will be appreciated by those skilled in the art, each file stream packet should be configured to be of an appropriate size for the storage device (physical) communication protocol in question. Thus, although as set out above in the present embodiment the file stream packets are configured to fit within SD blocks, for other forms of storage device, other sizes of file stream packet could and preferably should, be used.)

Figure 4A:
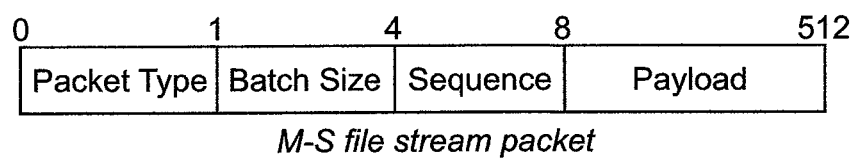
FIGS. 4A-4B show schematically the structure of the file stream packets that are transferred between the storage device and the host device in the embodiment of FIG. 1.

In the case of file stream packets being sent from the server module on the storage device 3 to the client module on the host device 2 (i.e. in essence for "output", master to slave (M S) file stream packets), the packet header has three fields, a packet type field, a packet sequence number and a packet batch size. This is shown in FIG. 4A.

The packet type field indicates either NO DATA (0) or DATA (1). DATA packets are packets having payloads that are to be processed by the receiver. NO DATA packets are used to "pad" data transfers when there are no DATA packets ready to be sent to the client module.

The packet sequence number is unique and increasing. As will be discussed further below, this is used by the client module to determine if its packet read was incorrect or not.

The packet batch size field indicates the number of file stream packets in the batch to which the packet in question belongs. (The use of this will be discussed below.)

Figure 4B:
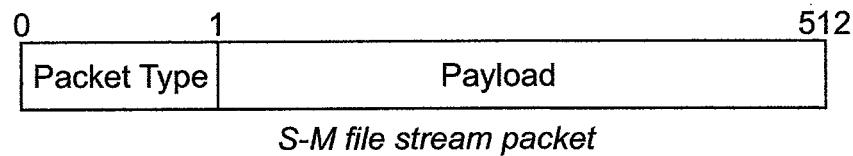

In the case of file stream packets sent from the client module on the host device 2 to the server module on the storage device 3 (i.e. for slave to master, S M, file stream packets), the packet header simply includes a packet type field. This is illustrated in FIG. 4B. In this case, the packet type field may indicate either DATA (1) or an acknowledgement, ACK(0x80), or a bit wise OR of these two types. Any data packet sent from the client module can be flagged as an ACK packet. If the client module needs to send an ACK packet when there are no DATA packets waiting, a NO DATA packet with an ACK flag is created.

For communications from the client module on the host device 2 to the server module on the slave device 3, the client module is configured simply to write appropriate file stream packets to the input file, /fxiin.str, when it has data to transfer. As discussed above, the server module on the storage device 3 when it sees the host device writing to the file /fxiin.str will recognise those data transfers as being data transfers for the server module and so "intercept" such data transfers and pass the file stream packets up the server module protocol stack for processing.

For the case of communications from the server module on the storage device 3 to the client module on the host device 2, again the basic operation of the file stream protocol is to send appropriate file stream packets to the host device 3. However, because of the nature of the communication between the host device 2 and the storage device 3, a number of steps are taken in the present embodiment in order to try to enhance the reliability and efficiency of the server to client communication. In particular, the Applicants have recognised that it may be necessary to take steps to allow for the fact that in the normal course, the expected operation of a host and storage device arrangement is that the host device will act as a master accessing the slave storage device, and it will be assumed that the storage device will not itself contain any "intelligence".

In the first place therefore the client component of the file stream protocol operates so as to cause the host device to periodically attempt to read the /fxiout.str output file on the storage device 3. This is because any reads of the storage device by the host device must be triggered by the host device itself, as that is the only mechanism that is provided in normal host storage device operation for reading the storage device. The client mode therefore causes the host device to poll the storage device periodically, to see if there are any communications from the server module on the storage device waiting.

The output file stream packets to be transferred to the host device when the host device reads the /fxiout.str file are grouped into batches of plural file stream packets, with each batch including up to the number of file stream packets (i.e. SD blocks) that the host operating system will as a minimum read for each read request. The batch size field in the file stream packet header discussed above indicates the number of file stream packets in the batch to which the packet in question belongs.

This has the advantage of helping to avoid wasting bandwidth when the host device reads the /fxiout.str file, for example where the host device operating system will tend to read more than one block from the storage device in any given read request. Grouping the output file stream packets into batches can help to ensure that each read by the host operating system is "filled" with useful file stream packets.

The file stream protocol is further configured such that the server module on the storage device 3 does not consider a packet batch to have been successfully sent to the client module on the host device 2 until it receives an acknowledgement (ACK) packet from the host device 2. Before this acknowledgement packet is received, the server module keeps resending the same file stream batch every time the host device reads the output file, /fxiout.str. This helps to avoid problems with file stream packets getting lost due to host device operating system reads which the client module has no control of.

To facilitate such acknowledgement operation, the file stream protocol packets include, as discussed above, a packet sequence number in their headers. This packet sequence number is unique and increasing and is used by the client module on the host device to detect if its file stream packet read was correct or not.

If a file stream packet arrives from the storage device with a sequence number that the client module has already processed, the client module considers that an error has occurred (e.g. that the read has in fact come from the host device's cache), and so discards the packet and continues to send its read requests without sending an acknowledgement.

Once the client module receives a complete packet batch with all the file stream packets having the correct sequence numbers, it can be concluded that the batch has been received and read correctly, and so the client module then sends an acknowledgement (ACK) file stream packet to the storage device (by writing the ACK file stream packet to the file /fxiin.str).

The server module on the storage device 3, when it receives this acknowledgement file stream packet from the client module on the host device 2, can then note that the current batch has been successfully received by the client module and so return the next packet batch when the host device 2 next reads the output file /fxiout.str.

The server module further operates in the present embodiment to ensure that the /fxiout.str file contains more output blocks than the host device can keep in its cache. The client module on the host device 2 is correspondingly configured to read blocks from the /fxiout.str file in a random order. Together, this has the effect that any given read of the /fxiout.str file by the host device 2 will tend to result in a cache "miss", thereby forcing the host device to read from the storage device itself.

This helps to avoid any caching operation on the host device 2 preventing the client module on the host device 2 from receiving new communications from the server module on the storage device 3. In particular, the Applicants have recognised that in normal operation of reading from the storage device 3, the host device 2 may cache a batch of blocks it has read from the storage device 3 and then reread the cached data blocks for subsequent reads of the same file. This could mean that new output packets from the storage device 3 might not be read by the host device, because the host device will tend to make any subsequent reads from its own cache instead of from the storage device. Arranging the output file reading operation to tend to cause the host to encounter cache misses, helps to avoid this problem.

Other arrangements to avoid the host tending to read only from its cache could also or instead be used if desired. For example, if the cache operation on the host device can be disabled, then the client module could be configured to disable the cache operation to ensure that the host device always reads from the storage device and not simply from its cache.

(Any caching operation on the host device should not cause any problem in respect of communications from the client module on the host device 2 to the server module on the storage device 3, because the host device 2 should support FSYNC( ) or equivalent functionality which ensures that any cache changes will always be written back to the storage device 3 in any event.)

Figure 5:
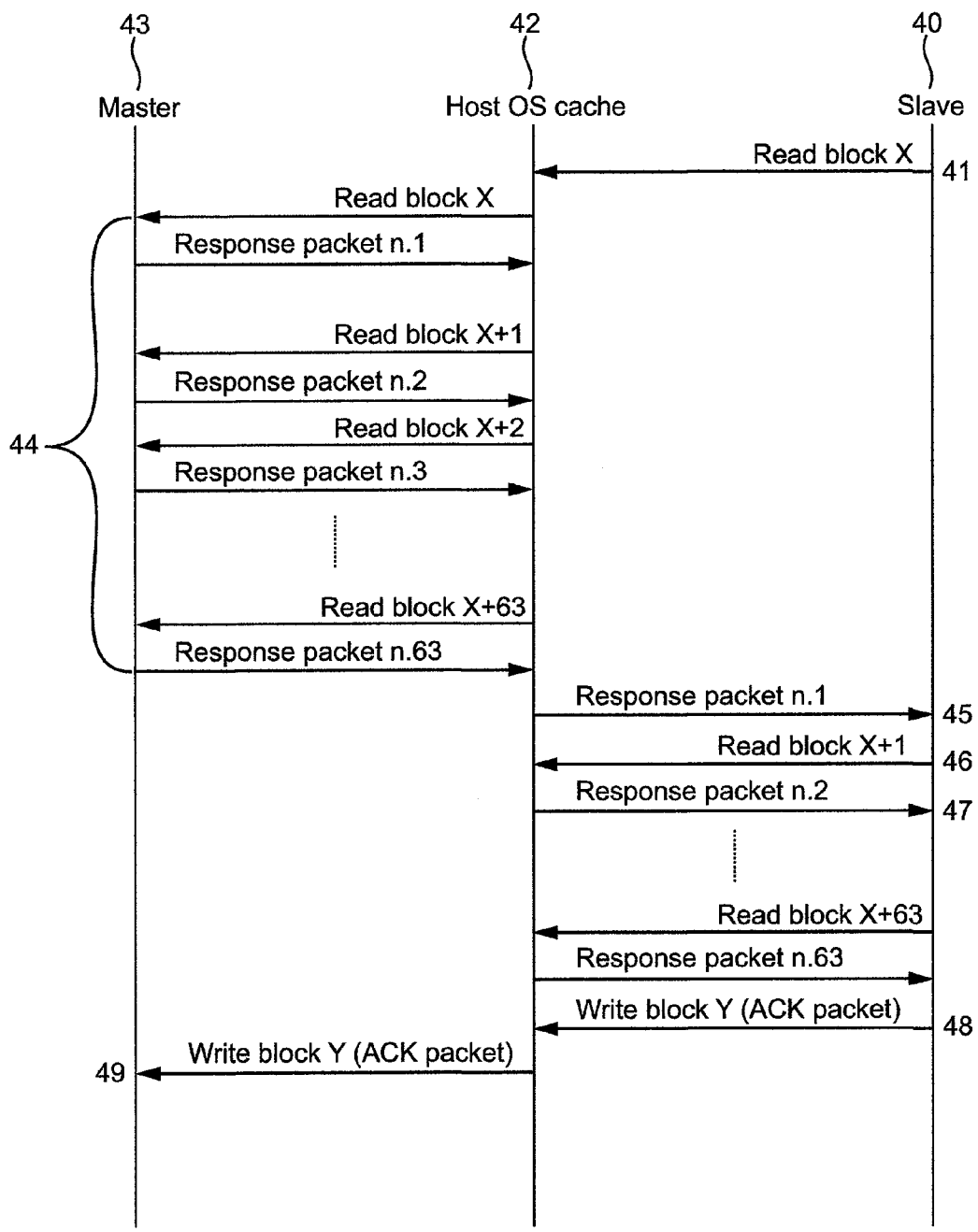
FIG. 5 shows the sequence of actions for a packet read from the host device in the embodiment of FIG. 1.

FIG. 5 shows schematically the sequence of actions for the client module on the host device when making a read of the output file /fxiout.str on the storage device 3 in accordance with the above arrangement (and in the ideal case where the single read is successful).

As shown in FIG. 5, the sequence starts with the client module (the "slave") 40 on the host device 2 making a read of a random output block X from the file /fxiout.str (step 41). This read instruction is passed to the host operating system cache 42, which then proceeds, in accordance with its normal procedure, to in fact cache 64 consecutive blocks from the file /fxiout.str from the master storage device 43. Thus, as shown in FIG. 5, the host operating system cache 42 first reads block X and the server module on the master storage device returns output block (file stream packet) number 1. The cache then reads address block X+1 and the server module returns file stream packet number 2, and so on, until 64 consecutive blocks have been requested and returned to the host operating system cache (step 44).

It should be noted here that in this example the batch size is set to 64, so the master server module 43 on the storage device 3 will deliver 64 file stream packets (blocks) to the cache 42. If the cache 42 were to request more blocks than there are file stream packets in a batch, then the master server module 43 would resend all packets until an acknowledgement is received.

Once the host operating system cache 42 has cached all 64 consecutive blocks, it can then return the first packet number 1 to the slave client module 40 (step 45). The slave client module 40 will then attempt to read the next block, X+1. In response to this read, the host operating system cache 42 will return the next packet, packet number 2 (steps 46, 47) and so on.

This will continue until the slave client module 40 has read and received all 64 packets in the batch from the cache 42. Assuming that all the packets in the batch have been correctly and successfully received by the slave module 40, it will then write an acknowledgement block (step 48) to the file /fxiin.str, which will be written back to the storage device 3 via the host operating system cache (step 49).

FIGS. 6-9 show schematically the use of the present invention to execute an application on a mobile phone.

Figure 6:
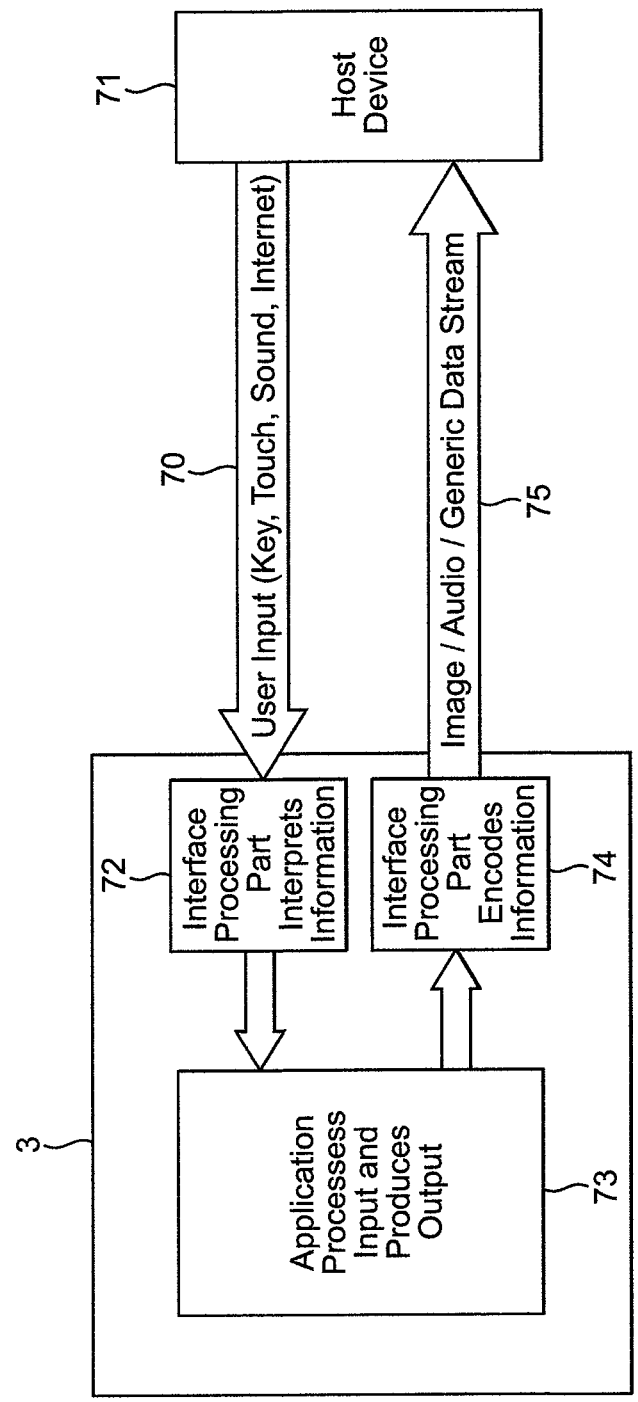
FIGS. 6, 7, 8 and 9 show an example of the operation of the embodiment of FIG. 1.

FIG. 6 shows schematically the general operation of the system of the present application when an application is being executed on the storage device. As shown in FIG. 6, user inputs 70 such as key presses, audio inputs, Internet information, etc., will be sent from the host device 71 and interpreted by the interface processing part 72 of the computing environment on the storage device 3 which will provide them in an appropriate form to the application processing part 73 on the storage device 3. The application processing part 73 of the storage device will then process the inputs and produce an appropriate output which will then be passed to the interface processing part for appropriate processing and encoding 74 into a form for returning as an image, audio or other generic data stream 75 to the host device 71 for output (e.g. display, sound, etc.) to the user. This process is then repeated as appropriate as the user uses the application being executed on the storage device.

Figure 7:
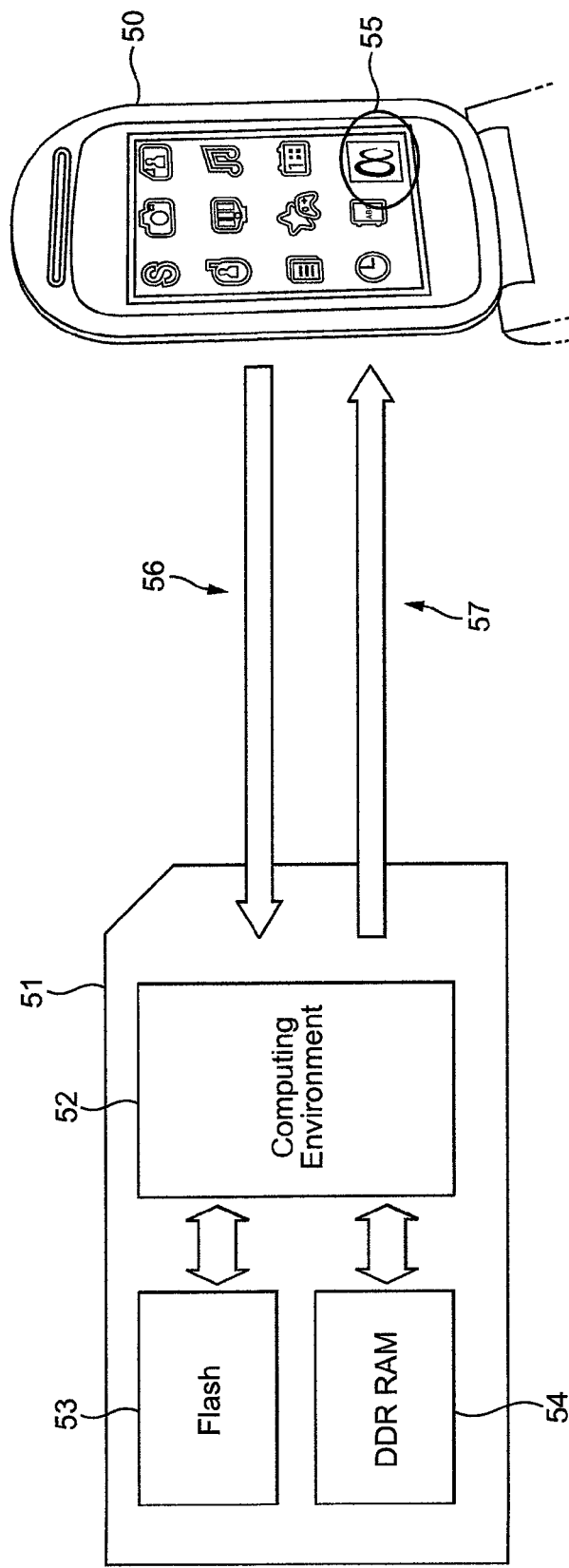
Figure 8:
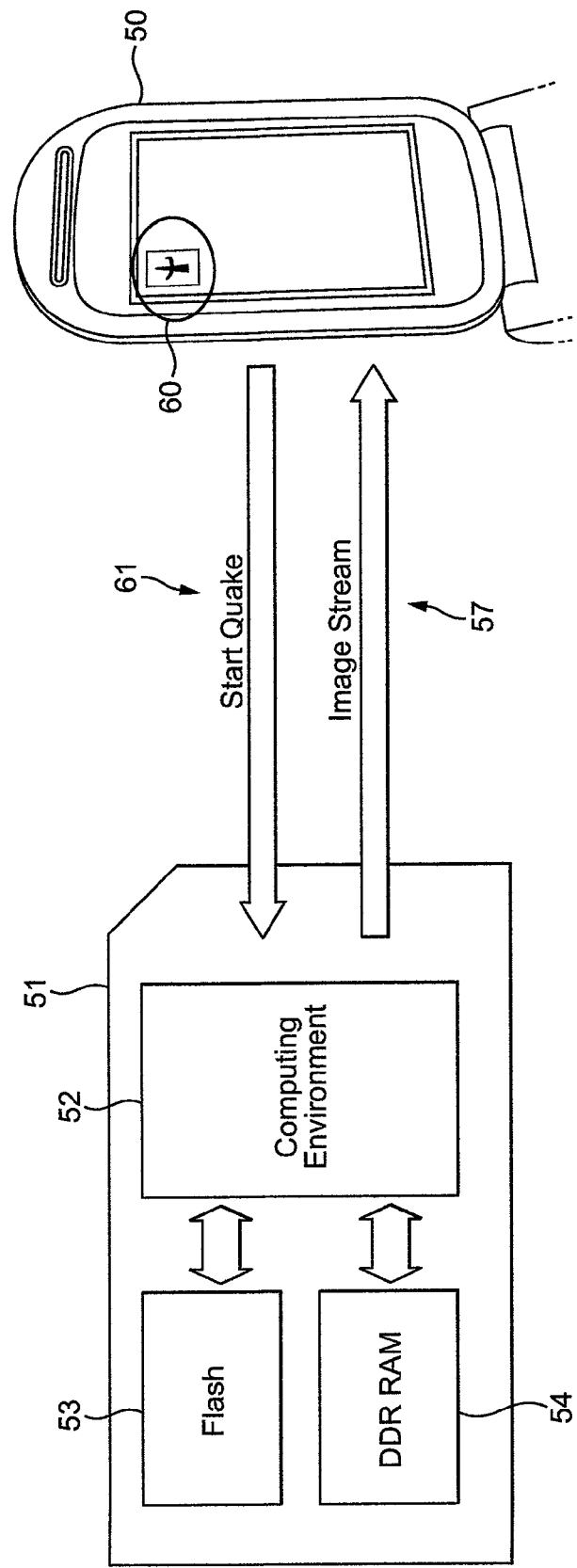
Figure 9:
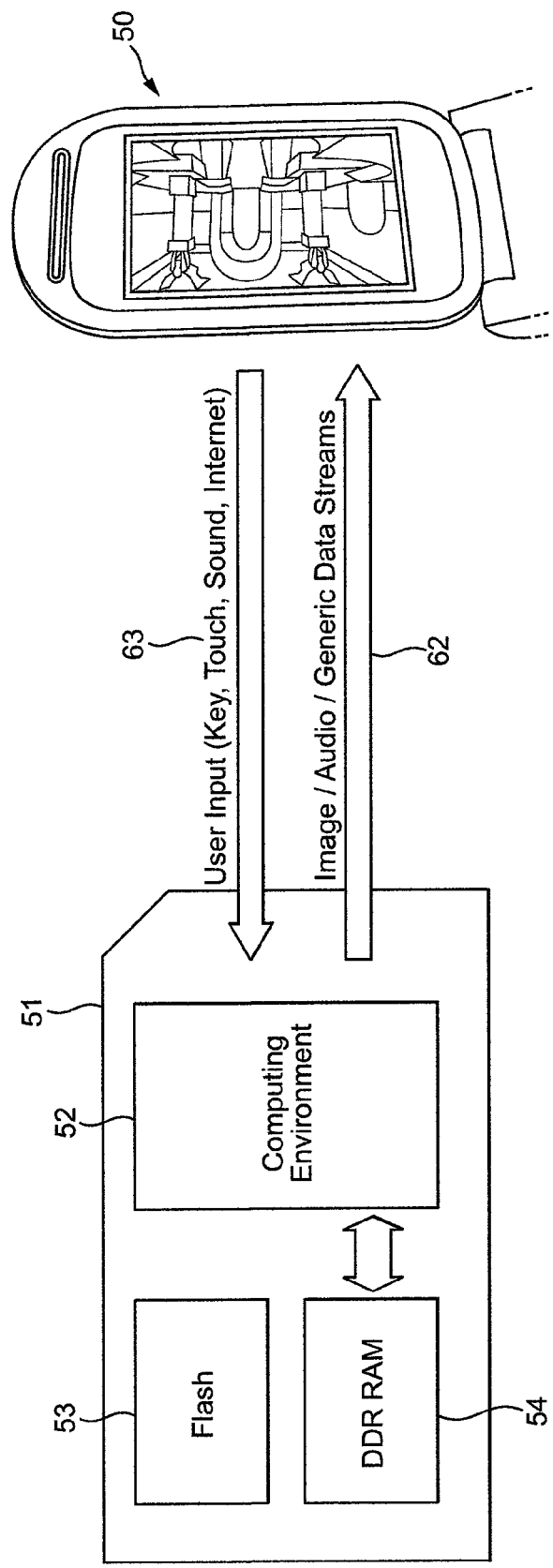

FIGS. 7-9 show this operation in more detail. These figures show schematically the host mobile phone 50, and the storage device 51, including the computing environment 52, the flash memory element 53 and a RAM 54.

As shown in FIG. 7, in a host device that is operable in the manner of the present embodiment, the user will be presented with a display that, for example, includes an icon 55 that the user can press to activate the operation of the client module on the host device 50.

When the user presses this icon 55 on the phone 50, the client module on the phone 50 will start, and will send an appropriate start command 56 to the server module on the storage device 51. The client module will also cause the host device to read the output, /fxiout.str, file on the storage device 51 periodically.

(For the user, the experience will be similar to starting an application in the native user interface of the phone 50.)

When the server module 52 on the storage device sees the command 56 from the host phone 50, it activates a user interface application in the computing environment 52 and returns an appropriate image stream 57 for display to the host device 50. This image stream may be sent, for example, as raw frame buffer data, compressed frame buffer data or a video stream.

As shown in FIG. 8, the server module continues to send the image stream 57 to the host device 50, and the client module on the host device 50 operates to display the corresponding image on the screen on the host device 50. (The image stream can be displayed in any appropriate manner on the host device 50, for example using bit blit to screen if a raw image is streamed, or by decoding the image stream and then bit blit to screen if a compressed image is streamed, or by using appropriate video decoding if the server module sends a video stream.)

In the present example, it is assumed that the image provided by the server module on the storage device 51 simply shows an icon representing the application that can be executed on the storage device 51, which in this case is shown, by way of example, as being the Quake 3 game.

The user interface image stream is continuously sent and displayed on the host device 50 until the user activates the icon 60 to start the application. In response to this user input, the client module on the host device 50 returns a start application (in this case a start "Quake") command 61 to the storage device 51. The server module on the storage device 51 will recognise that command and, for example, and in the present embodiment, cause the application (in this case Quake 3) to be loaded from the flash memory element 53 on the storage device 51 to appropriate DDR RAM 54 on the storage device 51 so that the application can then be executed by the computing environment 52 on the storage device 51.

FIG. 9 illustrates the operation once the application is running in the computing environment 52 on the storage device 51. As shown in FIG. 9, as the application is running, image, audio and other data will be generated by the application running on the storage device 51 and streamed 62 to the host device 50, with the host device 50 similarly sending relevant user inputs 63, such as key presses or touches, sound and Internet to the storage device 51 (to the server module on the storage device 51). This will continue until the user quits the application.

Although the above example is given in respect to the playing of a game, the computing environment 52 on the storage device 51 can, as discussed above, support other forms of application, such as a map application, an Internet browser application, a music player, a word processor, a spreadsheet, etc.

As will be appreciated from the above, the host device in the embodiments of the present invention simply needs to support mass storage functions to access the mass storage functions inside the storage device, and also to be capable of running the client module that interacts with the server module on the storage device. The host device may also, optionally, be able execute an application to communicate with the application processor with special function calls, but the host device still does not need to support more than ordinary mass storage functions in order to be able to do this. (This could be used, e.g., to offload computations from the host device to the application processing part of the storage device for execution. For example, computationally demanding tasks could be moved to the application processing part of the storage device by using function calls or executing program code directly on the application processing part using an appropriate communications protocol.)

Various alternatives to the above described embodiment would, of course, be possible. For example, although the present embodiment has been described with the interface processing part 7 and application processing part 6 of the computing environment 8 of the storage device 3 including a CPU, GPU and RAM, other arrangements could be used. For example, there could be one or more CPUs, one or more GPUs, various memory configurations (such as more DRAM, flash or various types of read only memories, etc.), FPGA modules, WLAN functions, Bluetooth and other wireless functions, GPS, biometric, axial and other types of sensors, and various physical interface functions such as SD, USB, SATA, ID, PCI, PCI express, etc. In general, so long as there are microprocessors/CPUs capable of running the server, applications and interface processing on the storage device 3 and enough memory to run the server etc., the computing environment 8 can otherwise be configured as desired.

Similarly, although in the above embodiment the client module on the host device 3 acknowledges successful receipt of communication from the server module on the storage device 3 by sending an explicit acknowledgement package to the server module, in another preferred embodiment the acknowledgement mechanism uses an "implicit" acknowledgement from the client module, without requiring the client module to send an explicit acknowledgement package (thereby saving SD bus bandwidth).

This is preferably achieved by dividing the output block address space shown in FIG. 3 into two defined output block address ranges, each associated with a respective different output file (such as /fxiout1.str and /fxiout2.str, respectively). The client is then configured to switch to reading a different output file (output address range) once it has checked and confirmed it has successfully read the current output file. The server module can then take the client module's transition to reading from another output file as being an acknowledgement that it has successfully read the previous output file.

Figure 10:
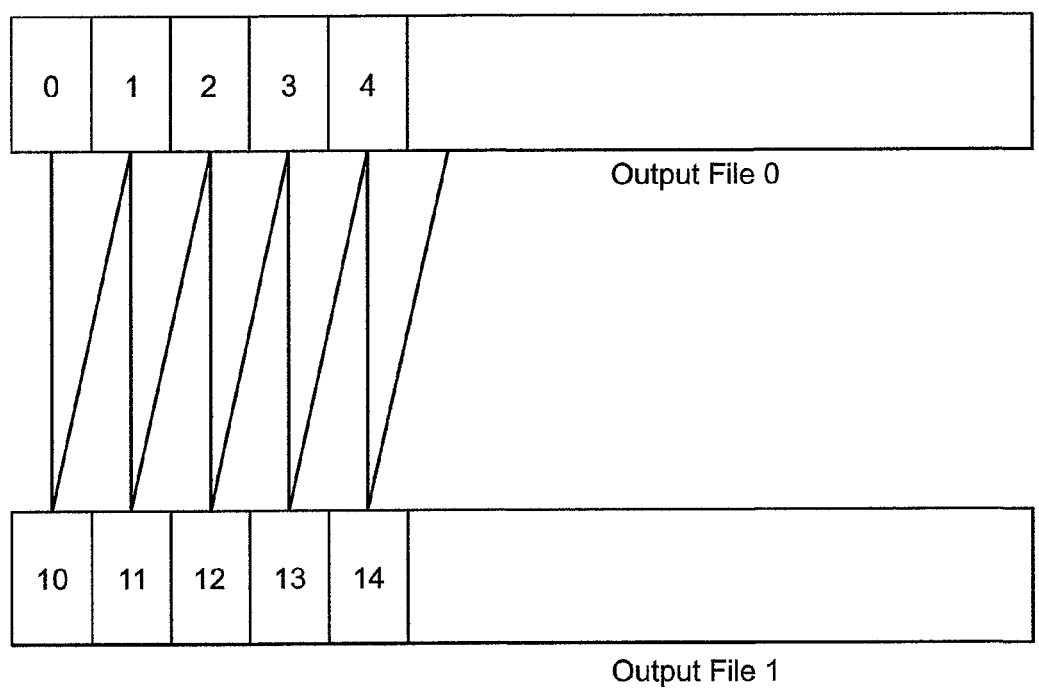
FIG. 10 shows an alternative acknowledgement mechanism.

FIG. 10 illustrates this. As shown in FIG. 10, the client module first reads block 0 from output file 0 on the storage device. Once it has successfully read the full block 0 from the output file 0, the client module then reads block 10 in output file 1. This implicitly also signals the successful read of block 0 of file 0 to the server module. Then, when the client module has successfully read block 10 from file 1, it next reads block 1 from file 0. This again signals to the server module that block 10 of file 1 has been successfully read, and so on.

In this way, the client module performs an "implicit" acknowledgement when it switches which output block addresses it reads (which it does by switching which output file it reads).

Although the present invention has been described above with particular reference to an arrangement in which the computing environment has separate application processing and interface processing parts, and in the context of an SD interface with the host device, other arrangements would, of course, be possible. For example, it is not necessary to have a separate interface processing part in the computing environment on the storage device, and instead there could be a single application processor (application processing part) that carries out both the application processing, and the interface processing (and the server operations on the storage device). Also, as discussed above, other interface arrangements, such as a USB interface, with the host device could be used.

Figure 12:
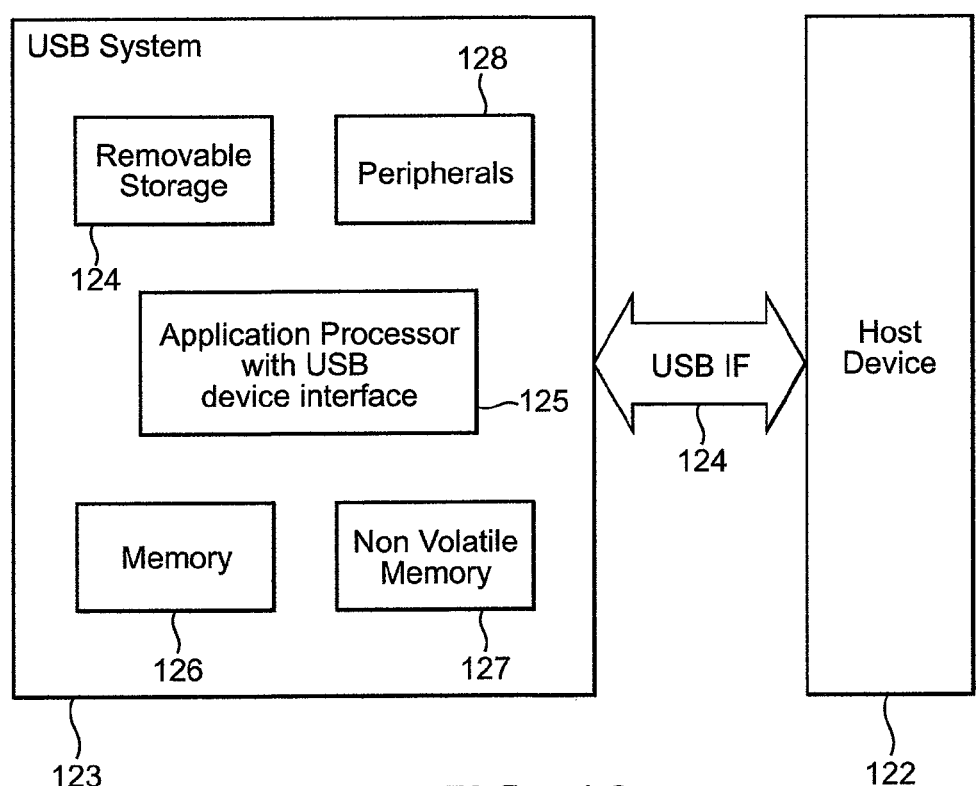
FIG. 12 shows schematically another embodiment of the present invention.

FIG. 12 shows such an alternative arrangement schematically.

In the arrangement shown in FIG. 12, the storage device 123 has a USB interface 124 with the host device 122, and the computing environment on the storage device includes a single application processor 125 which is, in this embodiment, a general purpose CPU.

The application processor 125 executes the application or applications on the storage device 123, executes the server module (the master software), performs all the master side interface processing, and has a USB device interface for communicating with the host device 122 via the USB interface 124.

The application processor 125 also has access, for example, to appropriate system memory 126, and, optionally, non volatile system memory 127, on the storage device 123. There may also, for example, be optional peripherals (such as GPIO, etc.) 128 provided on the storage device 123 for use by the application processor 125 and, e.g., an, optional, system boot ROM (not shown).

The storage device 123 also includes an appropriate mass storage element, which in FIG. 12 is shown as being provided by means of a removable mass storage element 129, such as a micro SD card or similar.

This arrangement shown in FIG. 12 will operate in the manner discussed above (as appropriate). Thus, for example, the application processor 125 is operable to communicate with the host device 122 in the manner discussed above and to allow applications being executed by the application processor 125 to use input and output functions, etc., of the host device 122 as discussed above.

It can be seen from the above that the present invention, in its preferred embodiments at least, provides a mechanism whereby an application may be executed on a storage device that is coupled to a host device, with the user accessing and using the application via the host device. Moreover, the arrangement maintains the standard interface between the host and the storage device, such that the host device assumes and can simply act as if there is a normal storage device attached to it (i.e. such that so far as the host operation is concerned, it will read and write files to what it believes to be a normal mass storage device). In this way, the present invention can provide a mechanism for allowing applications to be executed on the storage device, but without interfering with the existing host/storage device operation or with the normal use of the mass storage area of the storage device by the host device.

This is achieved, in the preferred embodiments of the present invention at least, by providing appropriate server and client modules on the storage device and host device, respectively, and having those modules communicate with each other by means of the normal file access (data transfer) mechanism of the host and storage device protocol.

The present invention, in its preferred embodiments at least, accordingly provides an improved host and storage device system that can, for example, be used to provide upgraded operations for a given host electronic device. In particular, by executing applications in the computing environment on the storage device, the execution of those applications is no longer dependent upon and is independent of the capabilities and performance of the host electronic device. This can, e.g., reduce the computational burden on the host electronic device, and, indeed, can allow applications to be executed for a host with limited resources (such as limited memory and computational resources). In effect therefore, the storage device can be used to provide an upgrade to the processing capabilities of the host system.

What is claimed is:

1. A storage device operable to be coupled to a host electronic device, the storage device comprising:
    at least one memory operable to store an operating system and at least one application and to provide mass storage functionality;
    at least one processor operable to run the operating system and execute the at least one application on the storage device; and
    at least one interface operable to couple the storage device to the host electronic device, the interface including at least one data communication path between the storage device and the host electronic device to allow data transfers therebetween and at least one power communication path between the storage device and the host electronic device such that when the storage device is operably coupled to the host electronic device, the storage device is powered by the host electronic device;
    wherein, the storage device has a master storage device mode in which the storage device is operable to control at least one slave function of the host electronic device and a slave storage device mode in which at least one slave function of the storage device is controlled by the host electronic device.

2. The storage device as recited in claim 1 wherein the data transfers between the host electronic device and the storage device further comprise file input and output accesses.

3. The storage device as recited in claim 1 wherein the data transfers between the host electronic device and the storage device further comprise read and write file accesses.

4. The storage device as recited in claim 1 wherein the at least one slave function of the host electronic device is selected from the group consisting of key pad, touch screen, audio input, video input, audio output and video output functions.

5. The storage device as recited in claim 1 wherein the at least one slave function of the storage device further comprises the mass storage functionality.

6. The storage device as recited in claim 1 wherein the at least one processor is part of a computing environment operable to execute the at least one application on the storage device.

7. The storage device as recited in claim 1 wherein the computing environment further comprises at least one CPU, at least one GPU and internal RAM.

8. The storage device as recited in claim 1 wherein the at least one interface further comprises a USB interface.

9. A storage device operable to be coupled to a host electronic device, the storage device comprising:
    at least one memory operable to store an operating system and at least one application and to provide mass storage functionality;
    at least one processor operable to run the operating system and execute the at least one application on the storage device; and
    at least one interface operable to couple the storage device to the host electronic device, the interface including at least one data communication path between the storage device and the host electronic device to allow data transfers therebetween and at least one power communication path between the storage device and the host electronic device such that when the storage device is operably coupled to the host electronic device, the storage device is powered by the host electronic device;
    wherein, the storage device has a master storage device mode in which the storage device is operable to control at least one slave function of the host electronic device.

10. The storage device as recited in claim 9 wherein the data transfers between the host electronic device and the storage device further comprise file input and output accesses.

11. The storage device as recited in claim 9 wherein the data transfers between the host electronic device and the storage device further comprise read and write file accesses.

12. The storage device as recited in claim 9 wherein the at least one slave function of the host electronic device is selected from the group consisting of key pad, touch screen, audio input, video input, audio output and video output functions.

13. The storage device as recited in claim 9 wherein the at least one processor is part of a computing environment operable to execute the at least one application on the storage device.

14. The storage device as recited in claim 9 wherein the computing environment further comprises at least one CPU, at least one GPU and internal RAM.

15. The storage device as recited in claim 9 wherein the at least one interface further comprises a USB interface.

16. A storage device operable to be coupled to a host electronic device, the storage device comprising:
    at least one memory operable to store an operating system and at least one application and to provide mass storage functionality;
    at least one processor operable to run the operating system and execute the at least one application on the storage device; and
    at least one interface operable to couple the storage device to the host electronic device, the interface including at least one data communication path between the storage device and the host electronic device to allow data transfers therebetween and at least one power communication path between the storage device and the host electronic device such that when the storage device is operably coupled to the host electronic device, the storage device is powered by the host electronic device;
    wherein, the storage device has a slave storage device mode in which at least one slave function of the storage device is controlled by the host electronic device.

17. The storage device as recited in claim 16 wherein the data transfers between the host electronic device and the storage device further comprise file input and output accesses.

18. The storage device as recited in claim 16 wherein the data transfers between the host electronic device and the storage device further comprise read and write file accesses.

19. The storage device as recited in claim 16 wherein the at least one slave function of the storage device further comprises the mass storage functionality.

20. The storage device as recited in claim 16 wherein the at least one processor is part of a computing environment operable to execute the at least one application on the storage device.

21. The storage device as recited in claim 16 wherein the computing environment further comprises at least one CPU, at least one GPU and internal RAM.

22. The storage device as recited in claim 16 wherein the at least one interface further comprises a USB interface.

\* \* \* \* \*